US012412260B2

(12) United States Patent
Nakamura

(10) Patent No.: US 12,412,260 B2
(45) Date of Patent: Sep. 9, 2025

(54) INSPECTION APPARATUS, METHOD, AND NON-TRANSITORY STORAGE MEDIUM FOR INSPECTING PRINT PRODUCT

(71) Applicant: CANON KABUSHIKI KAISHA, Tokyo (JP)

(72) Inventor: Shun Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 366 days.

(21) Appl. No.: 17/822,085

(22) Filed: Aug. 24, 2022

(65) Prior Publication Data
US 2023/0067117 A1    Mar. 2, 2023

(30) Foreign Application Priority Data

Aug. 31, 2021   (JP) .................... 2021-140731

(51) Int. Cl.
*G06T 7/00*     (2017.01)
*G06K 7/14*     (2006.01)
*G06T 7/70*     (2017.01)
*G06V 30/12*    (2022.01)

(52) U.S. Cl.
CPC .......... *G06T 7/0004* (2013.01); *G06K 7/1413* (2013.01); *G06K 7/1417* (2013.01); *G06T 7/70* (2017.01); *G06V 30/12* (2022.01); *G06T 2207/30144* (2013.01)

(58) Field of Classification Search
None
See application file for complete search history.

(56) References Cited

U.S. PATENT DOCUMENTS

| 2011/0286023 | A1 | 11/2011 | Hagisawa et al. |
| 2017/0039724 | A1* | 2/2017 | Yanagiuchi .......... G06V 30/224 |
| 2019/0007269 | A1 | 1/2019 | Ackley et al. |
| 2021/0142459 | A1 | 5/2021 | Ito |

FOREIGN PATENT DOCUMENTS

| JP | 2002216070 A | 8/2002 |
| JP | 2006165685 A | 6/2006 |
| JP | 2015069317 A | 4/2015 |
| WO | 2015159941 A1 | 10/2015 |

OTHER PUBLICATIONS

Machine translation of Japanese Patent Document No. 2002-216070, Nakajima et al., Aug. 2, 2002 (Year: 2002).*
Machine translation of Japanese Patent Document No. 2015-069317, Imamura et al., Feb. 9, 2017 (Year: 2017).*

* cited by examiner

*Primary Examiner* — Mark R Milia
(74) *Attorney, Agent, or Firm* — Canon U.S.A., Inc. IP Division

(57) ABSTRACT

An inspection apparatus performs dropout color processing on a first inspection area set for an image generated by reading a print product and then performs first recognition processing on the first inspection area, and further performs second recognition processing on a second inspection area set for the image and then performs an inspection of whether sufficient margin areas are allocated on the second inspection area, without performing dropout color processing.

11 Claims, 20 Drawing Sheets

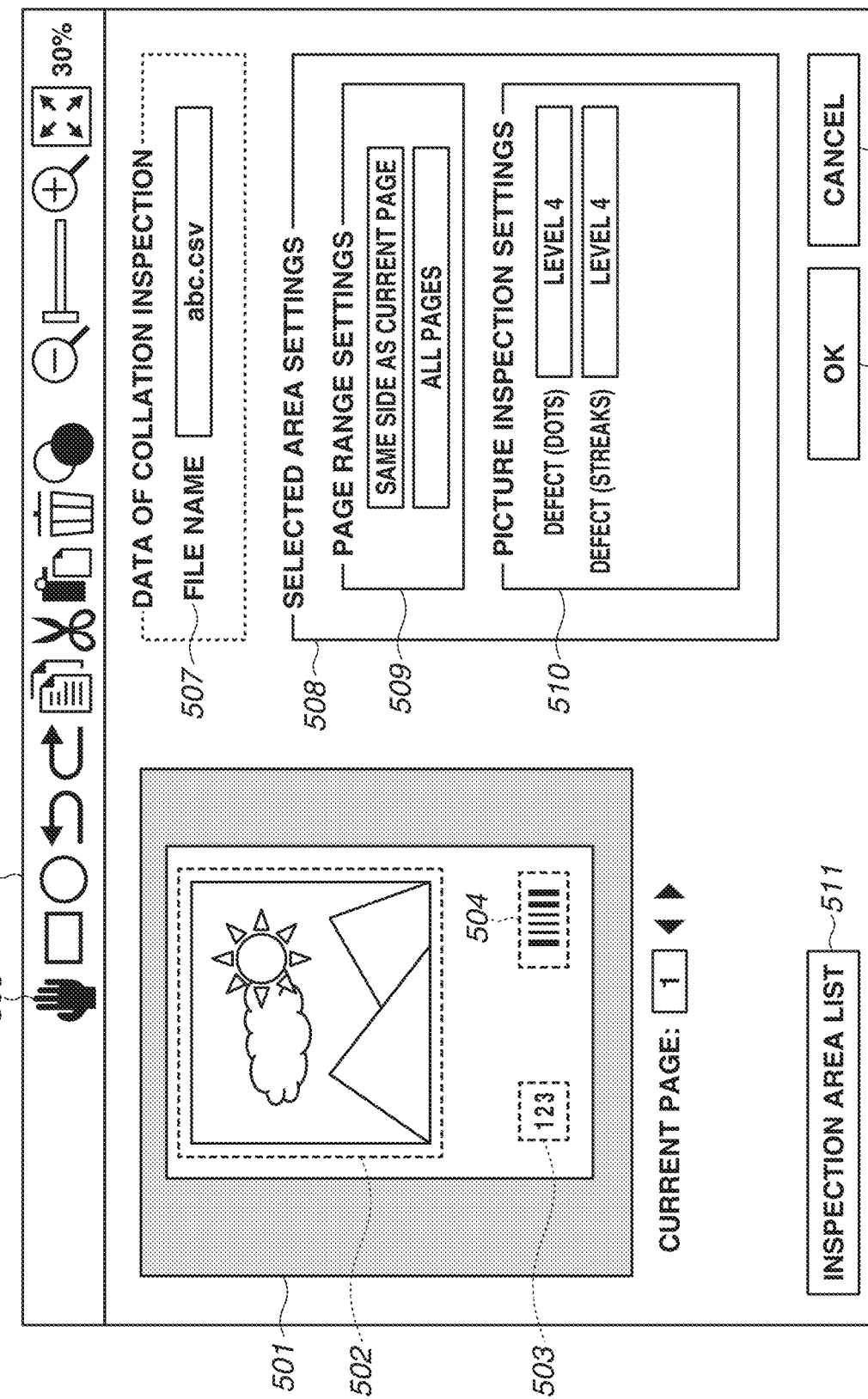

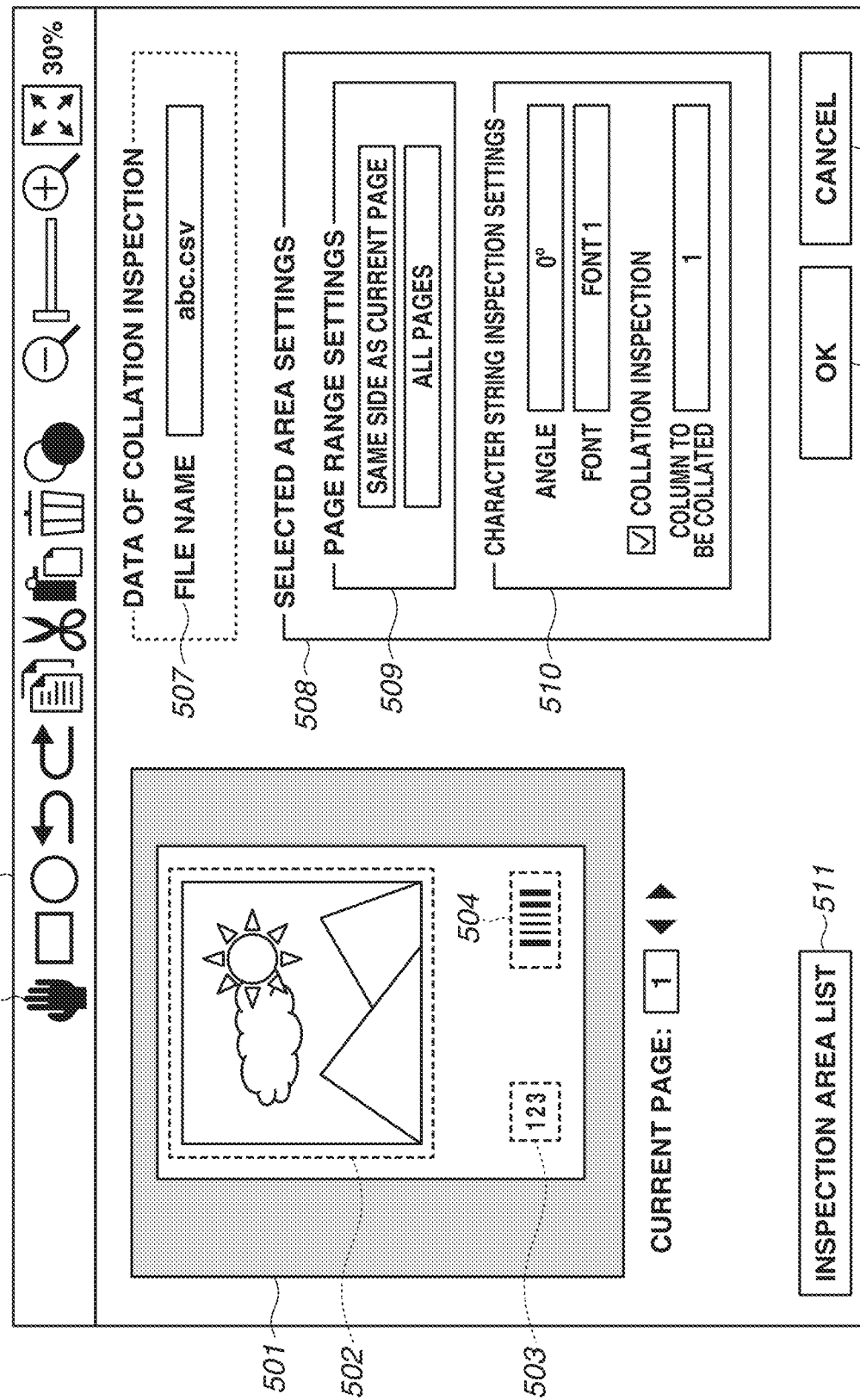

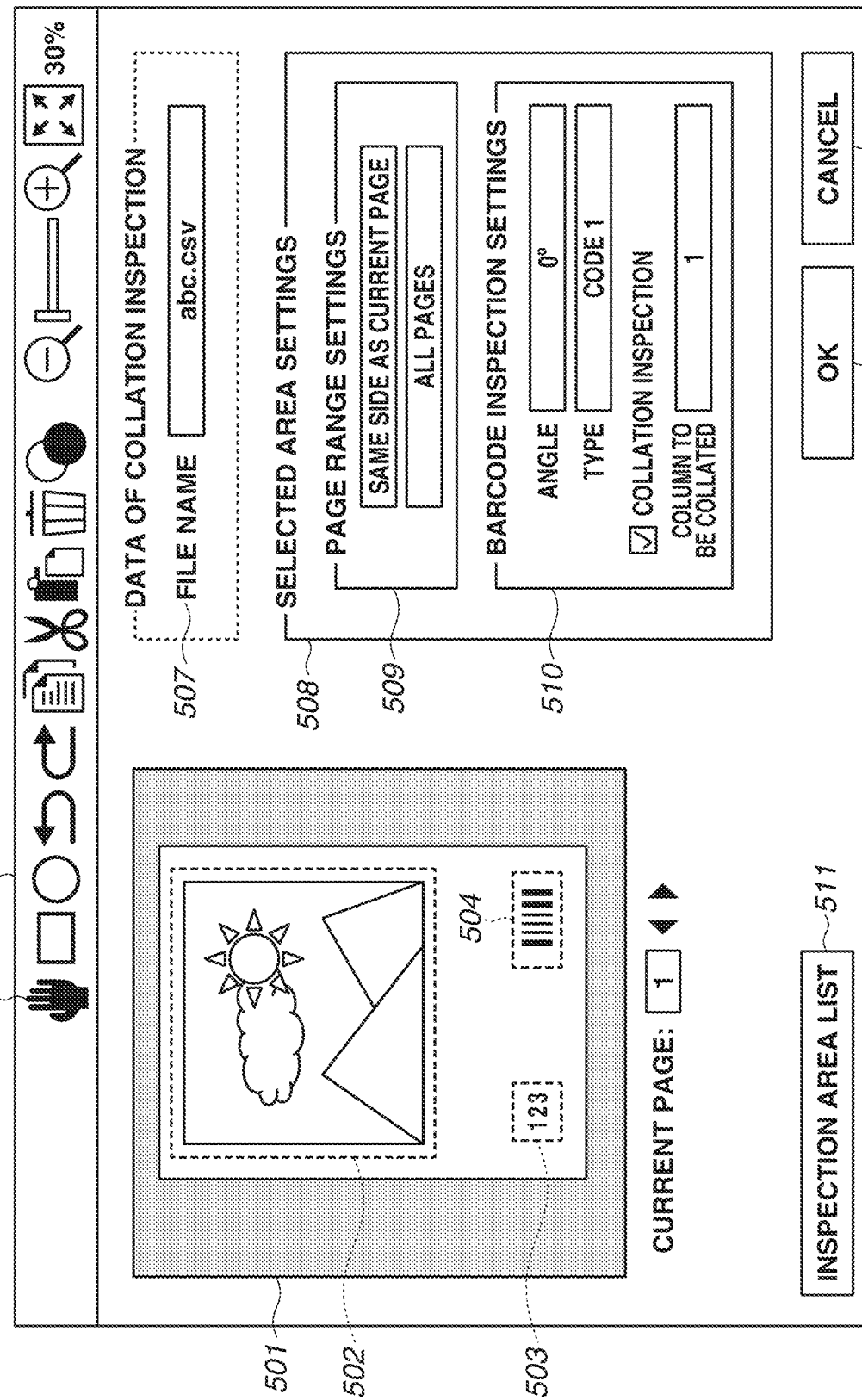

FIG.6

INSPECTION AREA LIST (601)

| INSPECTION AREA TYPE (602) | RANGE REFLECTED IN INSPECTION AREA (603) | SHEET (604) | SIDE (605) | DOTS (606) | STREAKS (607) | ANGLE (608) | FONT (609) | BARCODE (610) | COLLATION INSPECTION (611) | COLUMN TO BE COLLATED (612) |
|---|---|---|---|---|---|---|---|---|---|---|
| PICTURE INSPECTION AREA | SAME SIDE AS CURRENT PAGE | — | FRONT SIDE | 4 | 4 | | | | | |
| PICTURE INSPECTION AREA | ONLY ONE PAGE | 1 | FRONT SIDE | 3 | 2 | | | | | |
| PICTURE INSPECTION AREA | ALL PAGES | — | — | 3 | 4 | | | | | |
| CHARACTER STRING INSPECTION | ALL PAGES | — | — | | | 90° | FONT 1 ▼ | | ☑ | 1 |
| CHARACTER STRING INSPECTION | ALL PAGES | — | — | | | 0° | FONT 2 ▼ | | ☑ | 2 |
| BARCODE INSPECTION | ONLY ONE PAGE | 1 | FRONT SIDE | | | 0° | | CODE 1 ▼ | ☐ | 1 |
| BARCODE INSPECTION | SAME SIDE AS CURRENT PAGE | — | FRONT SIDE | | | 0° | | CODE 2 ▼ | ☑ | 2 |
| BARCODE INSPECTION | ONLY ONE PAGE | 1 | FRONT SIDE | | | 180° | | CODE 2 ▼ | ☑ | 3 |

[ CLOSE ] (613)

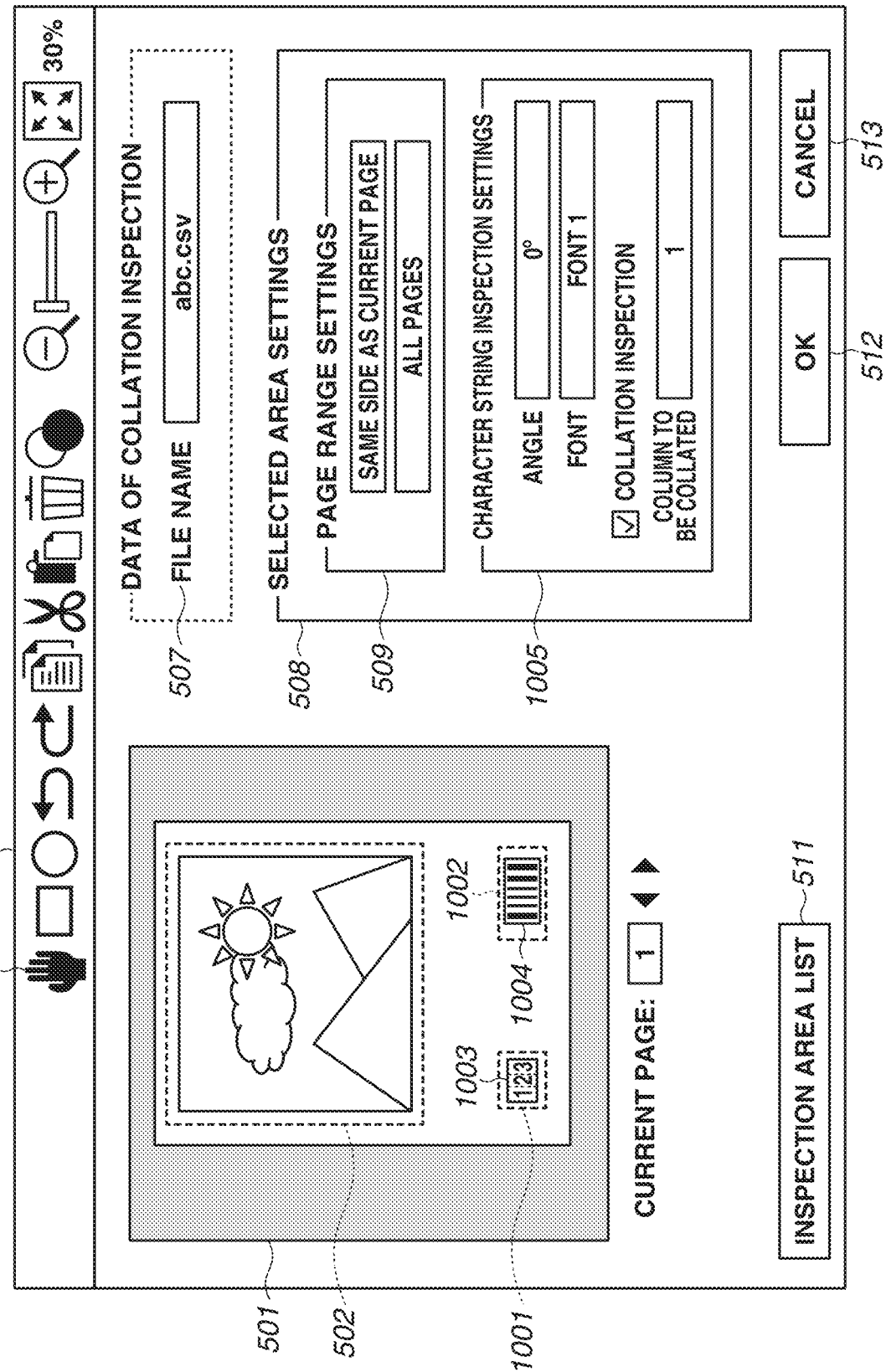

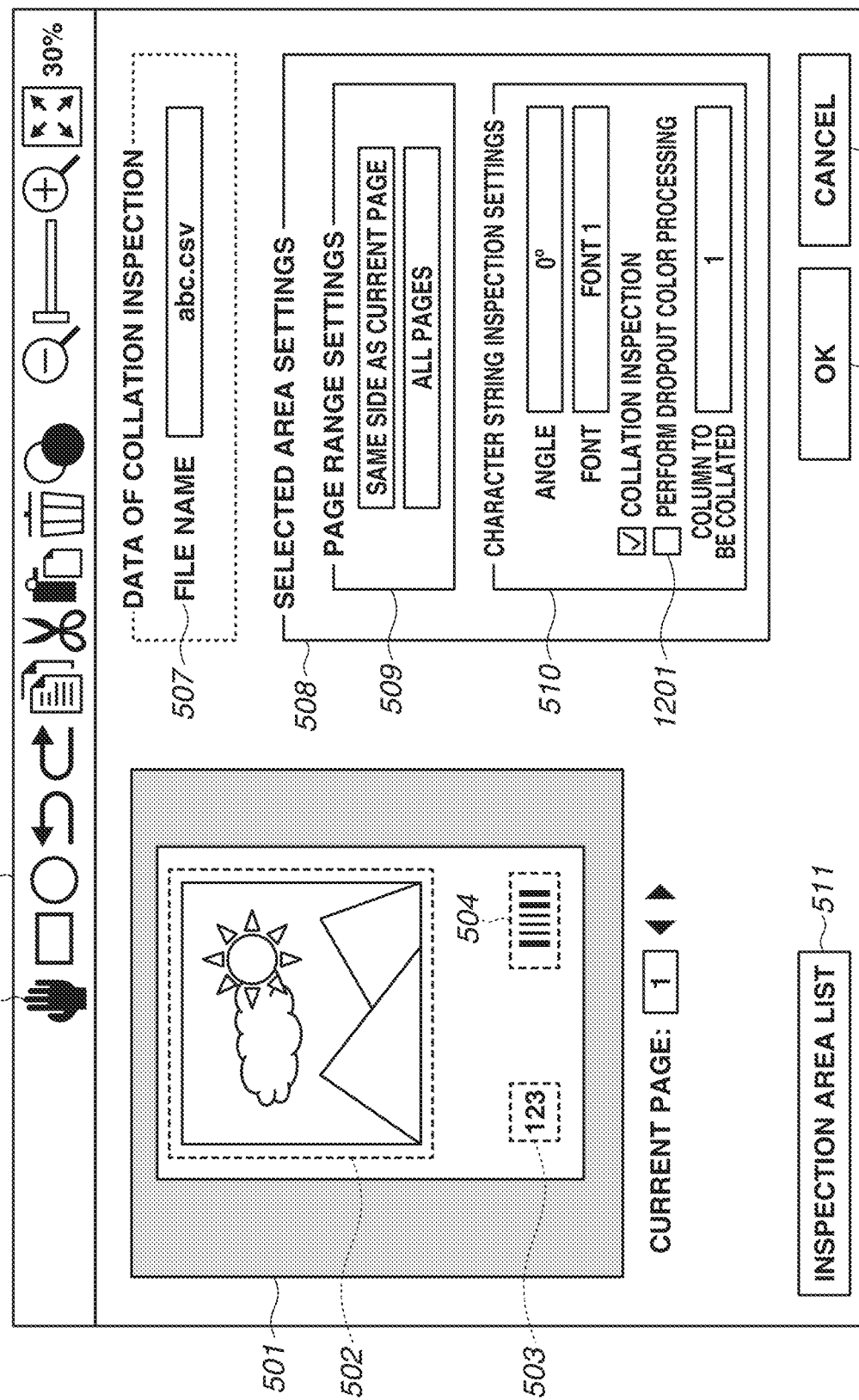

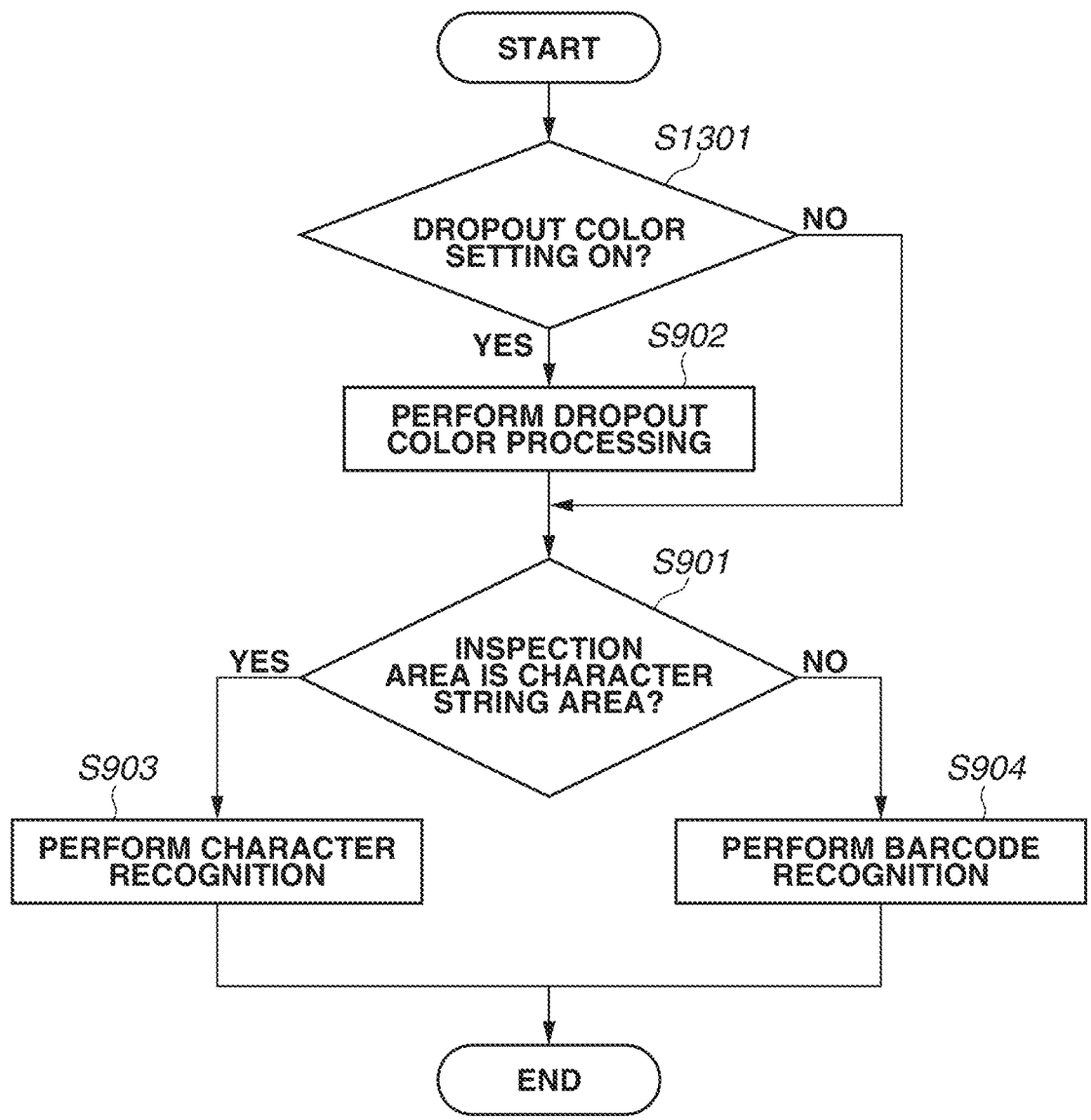

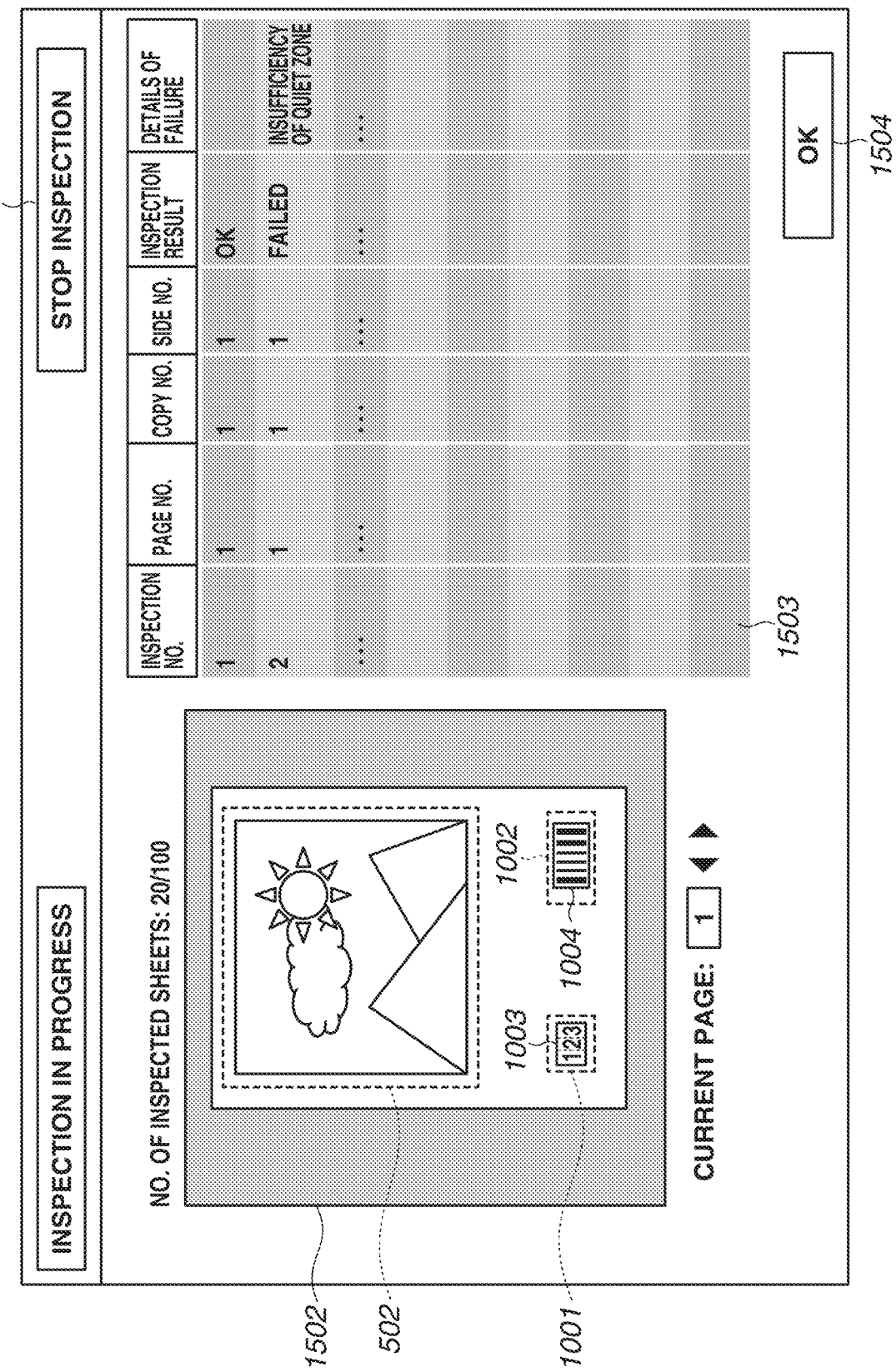

INSPECTION APPARATUS, METHOD, AND NON-TRANSITORY STORAGE MEDIUM FOR INSPECTING PRINT PRODUCT

BACKGROUND

Field

The present disclosure relates to an apparatus, a method, and a non-transitory storage medium for inspecting print quality of a print product.

Description of the Related Art

In recently known printing systems, a sheet printed by a printing apparatus is inspected during conveyance of the printed sheet, by using an inspection apparatus. In this inspection, the inspection apparatus reads the image of the conveyed sheet, and subjects the read image to image analysis to determine whether printing on the sheet is successfully performed. Such an inspection apparatus can detect defects, such as dropouts of character strings and barcodes printed on a print product, absent images, printing failures, missing pages, and color shifts. In a case where the printed sheet is determined to be a defective sheet in this way, the defective sheet is discharged to a discharge destination different from that of normal sheets. This enables a defective sheet to be prevented from being mixed in normal sheets and enables the operator to discard the defective sheet.

To improve the inspection accuracy in the above-described systems, some systems employ a technique in which an inspection is performed by reading inspection target character strings and/or barcodes through optical character recognition (OCR) and/or barcode recognition processing, and comparing recognition results with prepared correct answer values.

To improve the inspection accuracy in such a technique, the accuracy of character recognition (OCR) and/or the accuracy of barcode recognition processing are to be increased. Japanese Patent Application Laid-Open No. 2006-165685 discusses a technique for removing predetermined chromatic color components included in the inspection target area (dropout color processing) to remove unnecessary ruled lines over printed character strings and/or barcodes and then performing recognition processing, thus improving the recognition accuracy.

Meanwhile, to enable accurate recognition of barcodes and two-dimensional codes, a minimum margin area (a quiet zone) to be provided around code portions are prescribed.

An inspection apparatus is to inspect also whether printing is performed according to such prescriptions (whether unintended characters, drawings, or objects are printed in the margin area). More specifically, if no margin area (quiet zone) is allocated around printed barcodes or two-dimensional codes, the inspection apparatus is to detect the print product as a defective sheet.

As discussed in Japanese Patent Application Laid-Open No. 2006-165685, the recognition accuracy of OCR is improved by performing dropout color processing. However, subjecting the entire read image to the dropout color processing will eliminate pixels of predetermined chromatic color components incorrectly printed on the margin areas around code images (barcodes and two-dimensional codes). Thus, in a case where pixels of chromatic color components are present in the margin area, when the inspection apparatus subjects the image having been subjected to the dropout color processing to an inspection as to whether the margin area is allocated around code portions, the inspection apparatus determines that the margin area is allocated, resulting in a successful inspection result by the inspection apparatus.

SUMMARY

According to an aspect of the present disclosure, an inspection apparatus includes at least one memory that stores instructions, and at least one processor that executes the instructions to perform dropout color processing on a first inspection area set for an image generated by reading a print product and then perform first recognition processing on the first inspection area, and perform second recognition processing on a second inspection area set for the image and then perform an inspection as to whether a margin area is sufficiently allocated, without performing the dropout color processing.

Further features of the present invention will become apparent from the following description of exemplary embodiments with reference to the attached drawings.

BRIEF DESCRIPTION OF THE DRAWINGS

FIGS. 5A to 5D illustrate inspection setting screens.

FIG. 6 illustrates an inspection area list screen.

FIGS. 10A and 10B illustrate inspection setting screens.

FIGS. 12A and 12B illustrate inspection setting screens.

FIG. 13 is another flowchart for character and barcode recognition processing.

FIG. 15 illustrates an inspection result screen.

DESCRIPTION OF THE EMBODIMENTS

Figure 1:
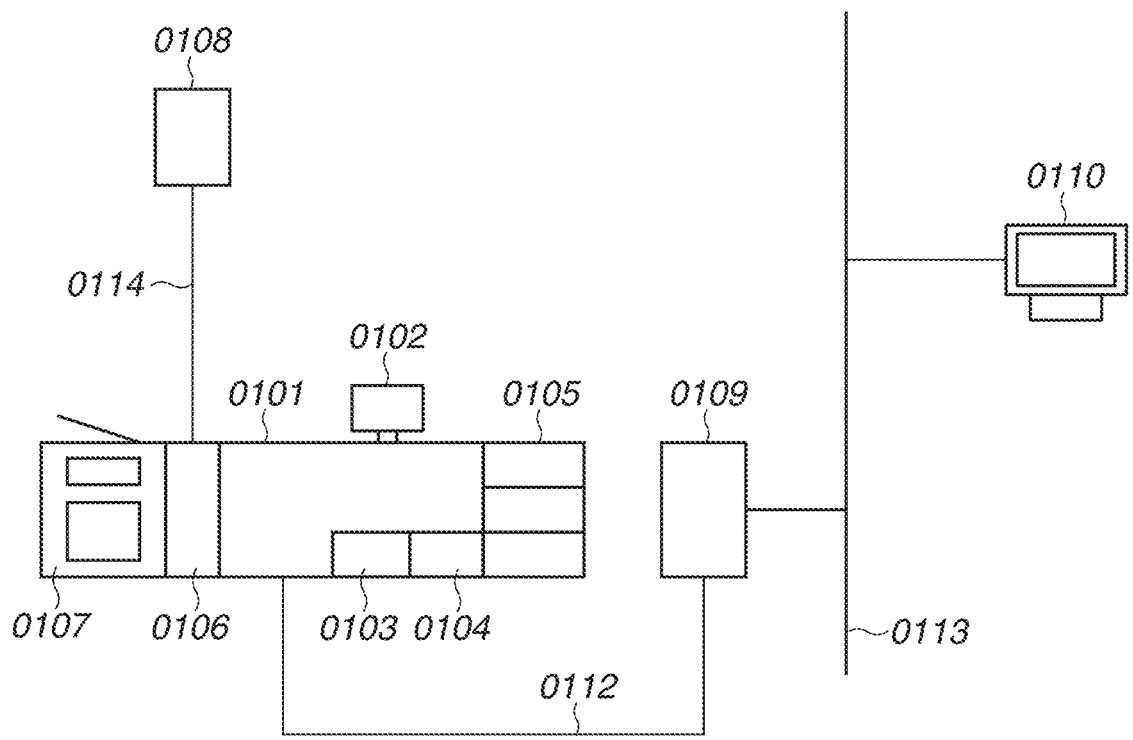
FIG. 1 is a schematic view illustrating configurations of an information processing apparatus, an inspection apparatus, and a printing apparatus.

A first exemplary embodiment of the present disclosure will be described below. FIG. 1 is a schematic view illustrating configurations of an information processing apparatus, an inspection apparatus, and an image forming apparatus according to the present exemplary embodiment. In the following description, an electrophotographic image forming apparatus serves as the image forming apparatus according to the first exemplary embodiment. However, the image forming apparatus according to the present exemplary embodiment may be an image forming apparatus employing a different image forming method, such as an inkjet method and an offset method.

An image forming apparatus 0101 is connected to an information processing apparatus 0109 via a communication cable 0112. The information processing apparatus 0109 is connected to a client computer 0110 and an inspection apparatus 0108 via a network 0113. The image forming apparatus 0101 include a user interface (UI) panel 0102, and sheet feed decks 0103 and 0104. The image forming apparatus 0101 is further connected to an option deck 0105 including three-stage sheet feed decks. The image forming apparatus 0101 is, for example, an electrophotographic image forming apparatus. The UI panel 0102 is, for example, a user interface including a capacitive touch panel.

The image forming apparatus 0101 further includes an inspection unit 0106 and a large-capacity stacker 0107. The inspection unit 0106 is connected to the inspection apparatus 0108 via a communication cable 0114. The large-capacity stacker 0107 includes a main tray and a top tray. Several thousand sheets can be stacked on the main tray.

A print job is generated by the client computer 0110, transmitted to the information processing apparatus 0109 via the network 0113, and then managed by the information processing apparatus 0109. The print job is transmitted from the information processing apparatus 0109 to the image forming apparatus 0101 via the communication cable 0112. The image forming apparatus 0101 performs print processing on a sheet based on the received print job. Print jobs may be generated and managed by the information processing apparatus 0109, transmitted to the image forming apparatus 0101 via the communication cable 0112, and managed by the image forming apparatus 0101.

All of the client computer 0110, the information processing apparatus 0109, and the inspection apparatus 0108 may be configured to communicate with the image forming apparatus 0101 via communication cables. More specifically, the connection configuration of the image forming apparatus 0101, the information processing apparatus 0109, and the client computer 0110 according to the present exemplary embodiment is to be considered to be illustrative. Needless to say, there are other various connection configurations in addition to that presented in the present exemplary embodiment.

Figure 2:
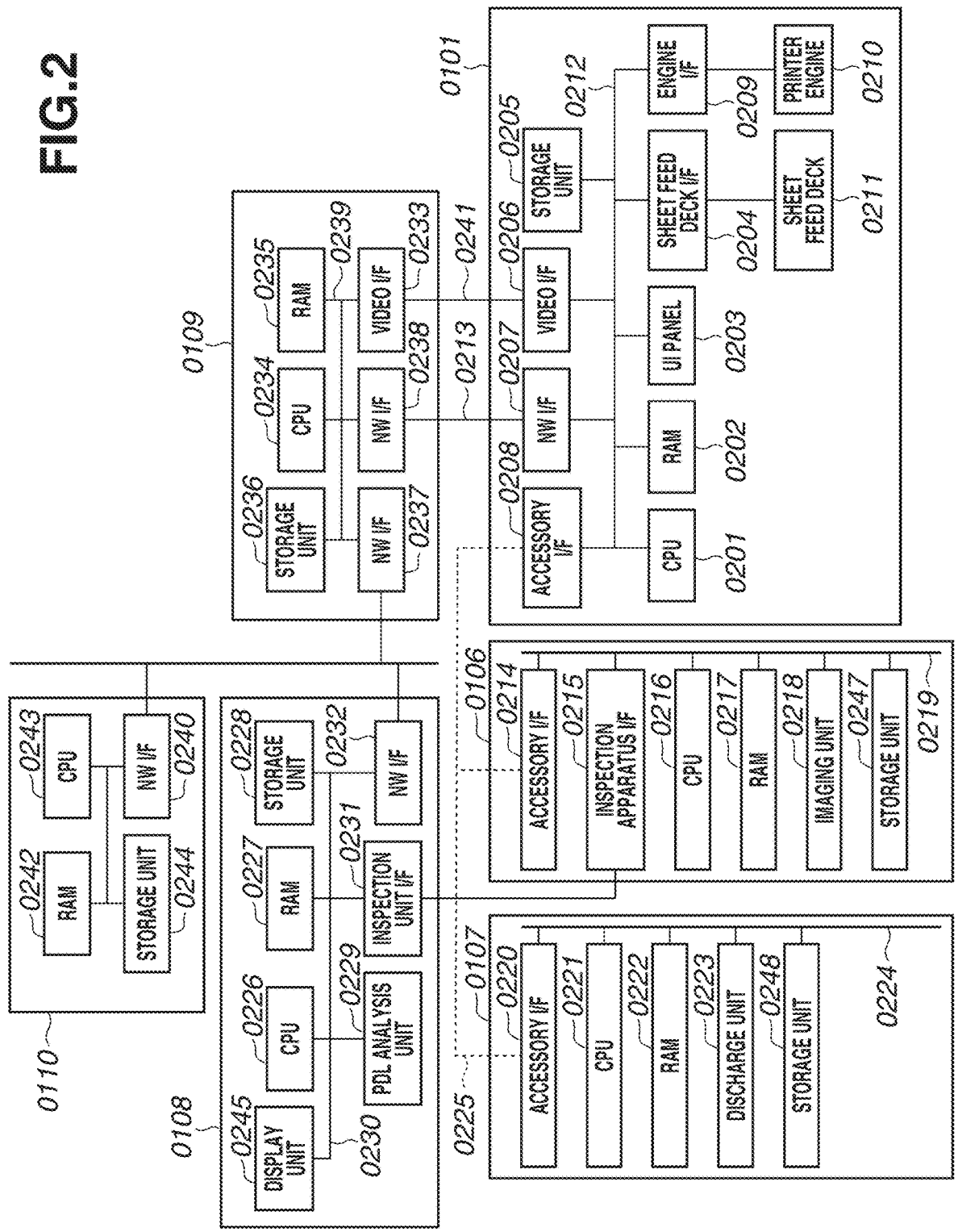
FIG. 2 is a block diagram illustrating configurations of the information processing apparatus, the inspection apparatus, and the printing apparatus.

FIG. 2 is a block diagram illustrating control configurations of the image forming apparatus 0101, the inspection apparatus 0108, the large-capacity stacker 0107, the information processing apparatus 0109, and the client computer 0110 according to the present exemplary embodiment.

A Central Processing Unit (CPU) 0201 controls each unit in the image forming apparatus 0101 and performs calculations via a system bus 0212.

The CPU 0201 functions as a processing unit that implements each process (described below) by loading a program stored in a computer-readable storage unit 0205 into a Random Access Memory (RAM) 0202 and then executing the program. The RAM 0202, a type of a general volatile storage device directly accessible from the CPU 0201, is used as a work area of the CPU 0201 or a temporary data storage area. The storage unit 0205 further functions as a temporary storage area and a work memory during operation of the image forming apparatus 0101. An engine interface (I/F) 0209 communicates with a printer engine 0210. A sheet feed deck I/F 0204 communicates with a sheet feed deck 0211. A hardware configuration including the sheet feed decks 0103 and 0104 and the option deck 0105, is collectively referred to as the sheet feed deck 0211, and the sheet feed deck 0211 functions as a processing unit for performing each piece of processing (described below). A UI panel 0203, a hardware configuration of the UI panel 0102, is used for performing overall operations of the image forming apparatus 0101. According to the present exemplary embodiment, the UI panel 0203 includes a capacitive touch panel.

A network interface (NW I/F) 0207 connected to a NW I/F 0238 of the information processing apparatus 0109 via a communication cable 0213 is used in communication between the information processing apparatus 0109 and the image forming apparatus 0101. While, in the present exemplary embodiment, the interfaces 0207 and 0238 connected to the system buses 0212 and 0239, respectively, are directly connected to each other, the present exemplary embodiment is not limited thereto. For example, the image forming apparatus 0101 and the information processing apparatus 0109 may be connected to each other via a network such as a local area network (LAN), and the connection form is not limited to a specific one. A video I/F 0206 connected to a video I/F 0233 via a video cable 0241 is used in image data communication between the information processing apparatus 0109 and the image forming apparatus 0101. The connection interface with the image forming apparatus 0101 in the information processing apparatus 0109 may have the functions of the video I/F 0233 and the NW I/F 0238 in an integrated way. The connection interface with the information processing apparatus 0109 in the image forming apparatus 0101 may have the functions of the NW I/F 0207 and the video I/F 0206 in an integrated way.

An accessory I/F 0208 connects to accessory I/Fs 0214 and 0220 via a communication cable 0225. More specifically, the image forming apparatus 0101 can communicate with the inspection unit 0106 and the large-capacity stacker 0107 with each other via the accessory I/Fs 0208, 0214, and 0220.

A CPU 0216 controls each unit in the inspection unit 0106 and performs calculations via the system bus 0219. The CPU 0216 functions as a processing unit that implements each process (described below) by loading a program stored in a computer-readable storage unit 0247 into a RAM 0217 and then executing the program. The RAM 0217, a type of a general volatile storage device directly accessible from the CPU 0216, is used as a work area of the CPU 0216 or a temporary data storage area. The storage unit 0247 functions as a temporary storage area and a work memory during operation of the inspection apparatus 0108. An inspection apparatus I/F 0215 connects to an inspection apparatus unit I/F 0231 via a communication cable. More specifically, the inspection unit 0106 is used in communication with the inspection apparatus 0108 via the inspection apparatus I/F 0215 and the inspection apparatus unit I/F 0231. An imaging unit 0218 is provided with an imaging function (scanning function), for example, with a contact image sensor (hereinafter referred to as a CIS). The imaging unit 0218 captures an image of the sheet passing through the inspection unit 0106 to generate an image (reading scan) and then transmits the image to the inspection apparatus 0108 via the inspection apparatus I/F 0215. The CIS included in the imaging unit 0218 is an example of a sensor and may be a sensor of other types, such as a Charge Coupled Device (CCD) image sensor, and the imaging method thereof (scanning method) is not limited to a specific one.

A CPU 0221 controls each unit in the large-capacity stacker 0107 and performs calculations via the system bus 0224. The CPU 0221 functions as a processing unit that implements each process (described below) by loading a program stored in a computer-readable storage unit 0248 into a RAM 0222 and then executing the program. The RAM 0222, a type of a general volatile storage device directly accessible from the CPU 0221, is used as a work area of the CPU 0221 or a temporary data storage area. A sheet discharge unit 0223 monitors and controls discharge operations onto the main and the top trays and the stacking statuses of the main and the top trays.

The CPU 0226 of the inspection apparatus 0108 controls each unit in the inspection apparatus 0108 and performs calculations via the system bus 0230. The CPU 0226 functions as a processing unit that implements each piece of processing (described below) by loading a program stored in a computer-readable storage unit 0228 into a RAM 0227 and then executing the program. The RAM 0227, a type of a general volatile storage device directly accessible from the CPU 0226, is used as a work area of the CPU 0226 or a temporary data storage area. The storage unit 0228 functions as a temporary storage area and a work memory during operation of the inspection apparatus 0108. A Page Description Language (PDL) analysis unit 0229 reads PDL data, such as Portable Document Format (PDF), PostScript, and Printer Control Language (PCL), received from the client computer 0110 and/or the information processing apparatus 0109, and performs interpretation processing. A display unit 0245, a liquid crystal display connected to the inspection apparatus 0108, for example, receives a user input to the inspection apparatus 0108 and displays the status of the inspection apparatus 0108.

The CPU 0234 of the information processing apparatus 0109 controls each unit in the information processing apparatus 0109 and performs calculations via the system bus 0239. The CPU 0234 functions as a processing unit that implements each process (described below) by loading a program stored in a computer-readable storage unit 0236 into a RAM 0235 and then executing the program. The RAM 0235, a type of a general volatile storage device directly accessible from the CPU 0234, is used as a work area of the CPU 0234 or a temporary data storage area. The storage unit 0236 functions as a temporary storage area and a work memory during operation of the information processing apparatus 0109. A network interface (hereinafter referred to as a NW I/F) 0237 is connected to the NW I/Fs 0232 and 0240 via a network. The information processing apparatus 0109 communicates with the inspection apparatus 0108 via the NW I/Fs 0237 and 0232. The information processing apparatus 0109 communicates with the client computer 0110 via the NW I/Fs 0237 and 0240.

The CPU 0243 of the client computer 0110 controls each unit in the client computer 0110 and performs calculations via the system bus. The CPU 0243 functions as a processing unit that implements each process (described below) by loading a program stored in a computer-readable storage unit 0244 into a RAM 0242 and then executing the program. The RAM 0242, a type of a general volatile storage device directly accessible from the CPU 0243, is used as a work area of the CPU 0243 or a temporary data storage area.

The storage unit 0244 functions as a temporary storage area and a work memory during operation of the client computer 0110.

Figure 3:
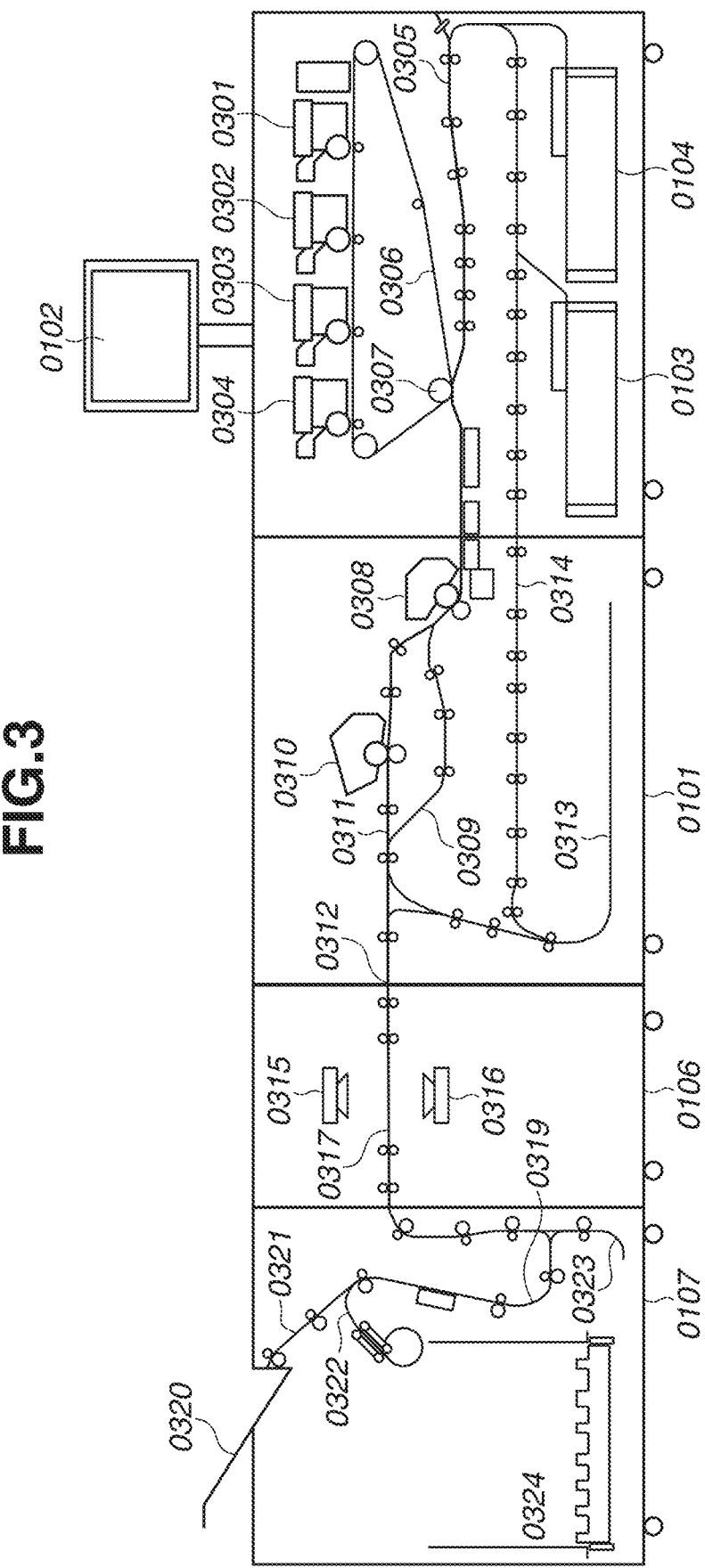
FIG. 3 illustrates internal configurations of the information processing apparatus, an inspection unit, the printing apparatus, and a large-capacity stacker.

FIG. 3 illustrates internal configurations of the image forming apparatus 0101, the inspection unit 0106, and the large-capacity stacker 0107. The image forming apparatus 0101 receives a user input via the UI panel 0102 and displays printing and device statuses. Various types of sheet can be stored in the sheet feed decks 0103 and 0104. Each sheet feed deck can separate the top sheet (also referred to as sheet) from the stored sheets and conveys the sheet to a sheet conveyance path 0305. Development stations 0301, 0302, 0303, and 0304 form toner images with Y, M, C, and K color toners, to form a color image. The formed toner images are primarily transferred to an intermediate transfer belt 0306. The intermediate transfer belt 0306 rotates in the clockwise direction. At a secondary transfer position 0307, the toner images are transferred to the sheet that has been conveyed from the sheet conveyance path 0305. A fixing unit 0308 including a pressure roller and a heat roller pressurizes and melts the toners to fix the toner images to the sheet passing between the rollers. The sheet that has exited the fixing unit 0308 passes through a sheet conveyance path 0309 to be conveyed to a position 0312. In a case where further melting and pressurization are to be performed to fix the toner images depending on the sheet type, the sheet is conveyed, after passing through the fixing unit 0308, to a second fixing unit 0310 via the above-described sheet conveyance path, subjected to additional melting and pressurization, and then conveyed to the position 0312 via a sheet conveyance path 0311. In the double-sided image forming mode, the sheet is conveyed to a sheet reversing path 0313 and then reversed in the sheet reversing path 0313. Then, the sheet is conveyed to a double-sided conveyance path 0314 and then subjected to the image transfer to the second side at a secondary transfer position 0307.

CIS's 0315 and 0316 are disposed to face each other in the inspection unit 0106. The CIS 0315 is a sensor that reads the upper surface of the sheet, and the CIS 0316 is a sensor that reads the lower surface of the sheet. The inspection unit 0106 scans the sheet by using the CIS's 0315 and 0316 at the timing when the sheet that has conveyed to the sheet conveyance path 0317 reaches a predetermined position. The image generated in scanning is transmitted to the inspection apparatus 0108 via the inspection apparatus I/F 0215 and the inspection apparatus unit I/F 0231. The CPU 0226 of the inspection apparatus 0108 determines whether the received image is defective, and notifies the inspection unit 0106 of the result of the determination via the inspection apparatus unit I/F 0231 and the inspection apparatus I/F 0215. The CPU 0216 of the inspection unit 0106 notifies the large-capacity stacker 0107 of the received determination result via the accessory I/Fs 0214 and 0220.

The large-capacity stacker 0107 is capable of stacking a large number of sheets. The large-capacity stacker 0107 includes a main tray 0324 as a tray for stacking sheets. The sheet that has passed the inspection unit 0106 enters the large-capacity stacker 0107 via a sheet conveyance path 0319. The sheet for which the inspection apparatus 0108 has determined that printing has been normally performed passes through the sheet conveyance paths 0319 and 0322 and then is stacked on the main tray 0324. The large-capacity stacker 0107 further includes a top tray 0320 as a discharge tray. The CPU 0221 performs control so as to discharge the sheet for which the inspection apparatus 0108has detected a defect, to the top tray 0320. In a case where the sheet is to be output to the top tray 0320, the sheet is conveyed to the top tray 0320 via the sheet conveyance paths 0319 and 0321. A reversing unit 0323 for reversing sheet is used to stack sheets on the main tray 0324. In a case where a sheet is to be stacked on the main tray 0324 so that the orientation of the entering sheet coincides with the orientation of the stacked sheets, the sheet is once reversed by the reversing unit 0323. In conveying the sheet to the top tray 0320, the sheet is not reversed by the reversing unit 0323 because the sheet is discharged as it is without being flipped when the sheet is stacked.

Processing, which is characteristic to the present disclosure, will be described below with reference to flowcharts and example screens.

The program of the image forming apparatus 0101 relating to the flowcharts stored in the storage unit 0205 of the image forming apparatus 0101 is loaded into the RAM 0202 and then executed by the CPU 0201. The program of the inspection apparatus 0108 relating to the flowcharts stored in the storage unit 0228 of the inspection apparatus 0108 is loaded into the RAM 0227 and then executed by the CPU 0226.

The program of the information processing apparatus 0109 relating to the flowcharts stored in the storage unit 0236 of the information processing apparatus 0109 is loaded into the RAM 0235 and then executed by the CPU 0234. The program of the client computer 0110 relating to the flowcharts is stored in the storage unit 0244 of the client computer 0110, loaded into the RAM 0242, and then executed by the CPU 0243.

Figure 4:
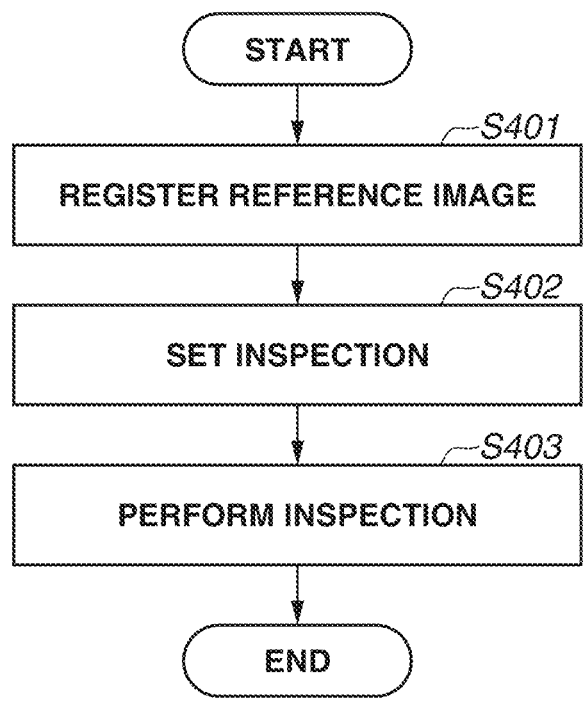
FIG. 4 is a flowchart of entire inspection processing.

An overall processing ranging from the registration of a reference image which is performed before starting the inspection, to the inspection of the inspection target image will be described below with reference to the flowchart in FIG. 4.

Initially, in step S401, the user performs an operation of registering the reference image that serves as a reference in the inspection. The user executes a print job for registering a reference image on the client computer 0110 to generate a reference image. The inspection apparatus 0108 then reads and registers the generated reference image.

Next in step S402, the user performs inspection setting to set various inspection parameters, inspection areas, and inspection levels (described in detail below).

In step S403, the inspection apparatus 0108 inspects a print product printed by the image forming apparatus 0101. More specifically, a print job for generating an inspection target print product by using the client computer 0110 is generated and transmitted to the information processing apparatus 0109, and then managed by the information processing apparatus 0109. When the image forming apparatus 0101 executes the print job and then outputs a print sheet, the inspection unit 0106 detects the conveyance of the print sheet on which printing has been performed, scans the print sheet with the CIS's 0315 and 0316, and stores the scanned images in a RAM 303 of the inspection apparatus 0108. The inspection apparatus 0108 compares the stored scanned images with the reference image to determine whether the printing is normal, and outputs an inspection result. The inspection is performed based on settings specified in the inspection setting by the user. The large-capacity stacker 0107 discharges a print sheet determined to be defective onto a different tray, based on the inspection result.

The inspection setting in step S402 will be described next with reference to FIGS. 5A to 5D and the flowcharts in FIGS. 6 and 7. The inspection setting is started when the reference image registered in the reference registration is selected.

FIGS. 5A to 5D illustrate examples of inspection setting screens displayed on the UI panel 0102 to receive inspection setting operations from the user. In each inspection setting screen, the user specifies the position of an inspection area on the previewed reference image, and then individually makes setting for each inspection area.

A preview display area 501 previews a reference image. In a case where the reference image has been generated based on a print job for a plurality of pages, the reference image for each page can be sequentially displayed according to an operation of changing the reference image to be previewed.

Frames 502 to 504 indicate inspection areas arranged on the preview. The inspection areas are arranged using an inspection area arrangement button 506. The size and position of each inspection area can be changed by mouse drag operations of the user. A frame 502 indicates an arrangement of a picture inspection area. A frame 503 indicates an arrangement of a character string inspection area. A frame 504 indicates an arrangement of a barcode inspection area. According to the present exemplary embodiment, the barcode inspection area is used for inspecting at least either a barcode or a two-dimensional code (such as a Quick Response (QR) code (Registered Trademark)).

When the user presses an inspection area selection button 505 and then click one of the frames 502 to 504 indicating the inspection areas with the mouse, the image forming apparatus 0101 receives an inspection area selection operation.

When the user presses an inspection area arrangement button 506, selects an inspection area type from the displayed pull-down menu, and selects an area to be specified as an inspection area in the preview display with a mouse drag operation, the image forming apparatus 0101 receives an inspection area arrangement operation.

A setting item 507 is used to select collation inspection data with a file selection method. The collation inspection data refers to a reference comma-separated value (CSV) file for data inspection to be subjected to collation in performing a data inspection. The reference CSV file is to be prepared by the user in advance. The reference CSV file includes correct answer character strings for the character string inspection and decoding-time correct answer character strings for the barcode inspection which are enumerated. More specifically, in executing a data inspection to inspect the read character strings and the decoded code images (barcode and two-dimensional code), the image forming apparatus 0101 collates the OCR result of the character string images in the character string inspection area and the result of decoded code images with the correct answer character strings enumerated in the reference CSV file.

A frame 508 includes setting items for the selected area. In the frame 508, individual setting values for an inspection area that is selected after the user presses the inspection area select button 505 are displayed.

A frame 509 includes setting items for the page range. When the user presses each button, an operation of specifying a page range to be inspected for the currently selected inspection area is received. When nothing is selected, the currently selected inspection area is arranged only on the page currently displayed in the preview display screen. In a case where "Same Side As Current Page" is selected, the currently selected inspection area is arranged on the other pages of the same side (front or back side) according to whether the currently selected inspection area is arranged on the front or back side of the sheet. When "All Pages" is selected, the currently selected inspection area is arranged on all pages regardless of the front side or back side.

Figure 5D:
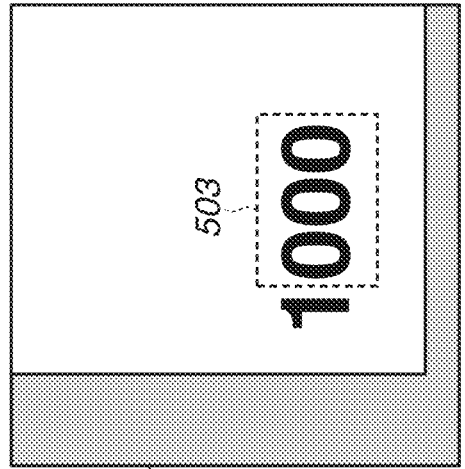

When the user selects "Side Same As Current Page" or "All Pages" to automatically arrange the inspection area on the pages other than the current page, the inspection area may be automatically arranged in a state where the arranged inspection area does not coincide with an originally intended inspection target area on the page. FIG. 5D illustrates an example where the automatically arranged inspection area does not coincide with the originally intended inspection target area because of the different number of digits of the character string inspection area. Assume an example where the user arranges an inspection area 503 (frame 503) to enclose a character string "100" when the first page is displayed. In this case, when the inspection area is automatically arranged at the same position on the second page, a part of a character string "1000" described at the same position on the second page becomes out of the inspection target area. When the second page is displayed on the preview display area 501, the user can visually recognize the deviation of the inspection area.

A frame 510 includes setting items for each inspection area type. Setting items according to the inspection area type selected with the inspection area select button 505 are displayed. The frame 510 in FIG. 5A includes setting items for the picture inspection displayed when the inspection area 502 is selected. The setting items for the picture inspection include types of defects to be inspected and minuteness levels of defects to be detected in the inspection of a print product. Examples of inspection items include round-shaped defects (hereinafter referred to as dots) and line-shaped defects (hereinafter referred to as streaks). Examples of inspection levels include five different levels (levels 1 to 5). At the inspection level 5, the thinner and smaller-sized defects can be detected than those at the inspection level 1. The inspection level can be set to each inspection item, for example, the inspection level 5 is set to dots and the inspection level 4 to streaks. The frame 510 in FIG. 5B includes setting items for the character string inspection displayed when the character string inspection area 503 is selected. The user sets setting items for each inspection area, including the angle of the inspection area, the font of character strings, whether the collation inspection is to be performed, and the column of a reference CSV file to be subjected to the collation in a case where the collation inspection is to be performed. The frame 510 displays an item for selecting the font of character strings, and a selection of a font is received from the user. The frame 510 in FIG. 5C includes setting items for the barcode inspection displayed when the barcode inspection area 504 is selected. The user sets setting items for each inspection area, including the angle of the inspection area, the type of code images (barcodes and two-dimensional codes), whether the collation inspection is to be performed, and the column of a reference CSV file to be subjected to the collation when the collation inspection is to be performed. According to the present exemplary embodiment, setting items for the selected inspection area type are displayed but irrelevant items are not displayed. However, all items may be displayed with irrelevant items disabled, or irrelevant items may be folded to be hidden.

When the user presses an inspection area list display button 511, the inspection area list illustrated in FIG. 6 is displayed.

When the user presses an inspection setting completion button 512, the inspection setting is completed, the settings is stored in the storage unit 0228, and the inspection setting processing is ended. In a case where any inconsistencies in settings are present, the inspection setting completion button 512 is disabled to prevent it from being pressed. An example of an inconsistency in the settings is that the setting item 507 of the collation inspection data is not set although there is an inspection area to be subjected to the collation inspection. When the user presses an inspection setting cancel button 513, the settings are cancelled and the inspection setting processing is ended.

FIG. 6 illustrates an example of an inspection area list screen displayed on the UI panel 0102. The screen displays a list of inspection areas currently being set and receives an inspection setting change operation from the user. Each row of the list corresponds to the arranged inspection area 502. For each setting, the inspection area select button 505 corresponds to a column 602, the frame 509 corresponds to columns 603 to 605, and the frame 510 corresponds to columns 606 to 612. The user can check and change the setting values by selecting the inspection areas one by one in the inspection setting screen. However, many operations are to be performed to check the settings of a plurality of inspection areas, and a lot of time is taken. By contrast, the inspection area list screen enables the user to collectively change the settings of the plurality of inspection areas while checking the settings. The inspection area list screen is displayed on the UI panel 0102 when the user presses the inspection area list display button 511. While the present exemplary embodiment assumes that the inspection area list screen is displayed in a floating window different from the inspection setting screen, the inspection area list screen may be displayed from the inspection setting screen.

A row 601 and the subsequent rows indicate setting values for each inspection area. A user's selection made with a mouse click operation is received. The user may right-click on a row to open a context menu. Then, an operation of a copy or deletion of the selected inspection area may be received.

The column 602 displays the inspection area type.

The column 603 displays the setting of the page range of the inspection area. The inspection area list screen does not have a preview, so that the user cannot visually recognize a position deviation in the inspection area which may occur when the page range is changed. Thus, a page range setting operation is not accepted from the inspection area list screen. The column 604 displays the sheet where the inspection area is arranged. The column 605 displays the side where the inspection area is arranged.

The column 606 displays the inspection level setting for dots. The column 607 displays the inspection level setting for streaks.

The column 608 displays the angle setting for the inspection area. According to the present exemplary embodiment, the user cannot confirm an incorrect angle setting in a screen not having a preview as well as the inspection area, an angle setting operation is not accepted from the inspection area list screen.

The column 609 displays the font setting for the inspection area. A font change operation by the user is accepted in the column 609. The column 610 displays the type setting of the code image (barcode or two-dimensional code) in the inspection area. A code type change operation by the user is accepted in the column 610.

The column 611 displays the setting as to whether to perform the inspection area collation inspection. A user's operation of changing the setting as to whether to perform the collation inspection is accepted in the column 611. The column 612 displays the setting of the column of a reference CSV file to be subjected to the collation for the inspection area. A column setting change operation by the user is accepted in the column 612. When a close button 613 for ending the display of the inspection area list is pressed, the display of the inspection area list is ended.

Figure 7:
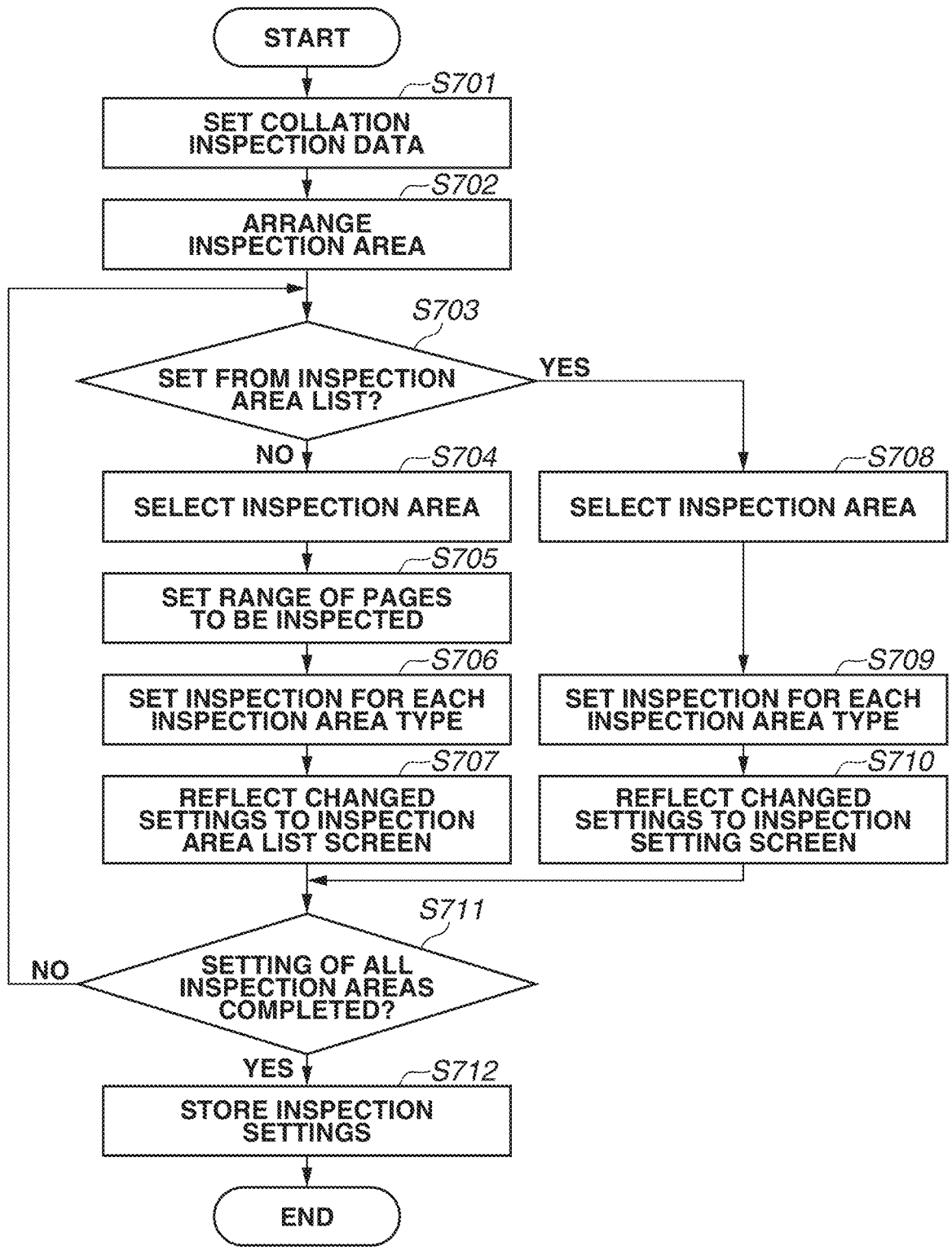
FIG. 7 is a flowchart for inspection setting processing.

FIG. 7 illustrates processing that is performed by the inspection apparatus 0108 when an inspection setting start operation is performed on the inspection apparatus 0108. In response to receiving an operation from the inspection setting screen and the inspection area list displayed on the display unit 0245 of the inspection apparatus 0108, the CPU 0226 of the inspection apparatus 0108 performs various processes for performing the inspection setting.

In step S701, the inspection apparatus 0108 receives a collation inspection data setting operation from the inspection setting screen. According to the present exemplary embodiment, a collation inspection data setting operation refers to an operation on the setting item 507 for the collation inspection data by the user.

In step S702, the inspection apparatus 0108 receives an inspection area arrangement operation from the inspection setting screen. According to the present exemplary embodiment, an inspection area arrangement operation refers to an operation on the inspection area arrangement button 506 by the user.

In step S703, the inspection apparatus 0108 determines whether the user has set the individual inspection area from the inspection setting screen or the inspection area list screen. If the inspection apparatus 0108 determines that the user has made the setting from the inspection setting screen (NO in step S703), the processing proceeds to step S704. The inspection apparatus 0108 performs operations in steps S704 to S707. If the inspection apparatus 0108 determines that the user has made the setting from the inspection area list screen (YES in step S703), the processing proceeds to step S708. The inspection apparatus 0108 performs operations in steps S708 to S710. The operations in steps S704 to S707 in a case where the user has made setting from the inspection setting screen will be described below.

In step S704, the inspection apparatus 0108 receives an inspection area selection operation from the inspection setting screen. According to the present exemplary embodiment, an inspection area selection operation refers to a user's operation of pressing the inspection area select button 505 displayed on the UI panel 0203 and then selecting any one of the inspection areas arranged in the preview display area.

In step S705, the inspection apparatus 0108 receives a page range setting operation from the inspection setting screen. According to the present exemplary embodiment, a page range setting operation refers to a user's operation on the setting item 509 (frame 509) in the page range displayed on the UI panel 0203.

In step S706, the inspection apparatus 0108 receives a setting operation for each inspection area type from the inspection setting screen. According to the present exemplary embodiment, a setting operation for each inspection area type refers to a user's operation on the setting item 510 (frame 510) for each inspection area type displayed on the UI panel 0203.

In step S707, the inspection apparatus 0108 reflects the result of the setting operation performed on the inspection setting screen to the inspection area list screen to synchronize the displayed details.

The operations in steps S708 to S710 that are performed when the user has made setting from the inspection area list screen will be descried below. Since the inspection area list screen in FIG. 6 does not have a preview, the user cannot visually recognize a position deviation in the inspection area which may occur when the page range is changed. Thus, the inspection apparatus 0108 does not accept a page range setting operation from the inspection area list screen.

In step S708, the inspection apparatus 0108 receives an inspection area selection operation from the inspection area list screen. According to the present exemplary embodiment, an inspection area selection operation refers to a user operation of selecting the row 601 of the setting values for each inspection area displayed on the UI panel 0203.

In step S709, the inspection apparatus 0108 receives a setting operation for each inspection area type from the inspection area list screen. According to the present exemplary embodiment, a setting operation for each inspection area refers to a user's operation on the columns 608 to 612 for the setting values displayed on the UI panel 0203.

In step S710, the inspection apparatus 0108 reflects the result of the setting operation performed by the user in the inspection area list screen to the inspection setting screen to synchronize the displayed details.

In step S711, the inspection apparatus 0108 determines whether the inspection setting made by the user is completed. If the user presses the inspection setting completion button 512, the inspection apparatus 0108 determines that the inspection setting is completed (YES in step S711). Then, the processing proceeds to step S712. If the inspection apparatus 0108 determines that the inspection setting is incomplete (NO in step S711), the user performs the inspection area selection operation in step S703. The inspection apparatus 0108 continues the inspection setting processing.

In step S712, the inspection apparatus 0108 stores the settings in the storage unit 0228 and then ends the inspection setting processing.

The inspection setting and the operation of the inspection apparatus 0108 will be described below. In response to the user pressing an inspection start button (not illustrated) displayed on the UI panel 0203, the inspection apparatus 0108 performs the inspection. The operation of the inspection apparatus 0108 will be described below with reference to the flowchart in FIG. 8.

In step S801, based on the inspection setting performed by the user, the inspection apparatus 0108 detects, as printing-time defects, round-shaped defects (dots) and line-shaped defects (streaks) included in a sheet. A known technique is applicable to the method of detecting defects, and thus, a description thereof will be omitted.

In step S802, the inspection apparatus 0108 rotates the inspection area according to the angle set in the frame 510 of FIGS. 5B and 5C at the time of inspection setting.

In step S803, the inspection apparatus 0108 subjects the inspection area rotated in step S802 to the character recognition and the barcode recognition processing. As discussed below, for the barcode inspection area, the inspection apparatus 0108 performs not only the barcode recognition processing (decode processing) but also the inspection of whether a quiet zone is sufficiently allocated.

In step S804, the inspection apparatus 0108 collates a character recognition result and a barcode recognition result (a result of decoded code image) acquired in step S803 with the correct answer character strings enumerated in a reference CSV file. The inspection apparatus 0108 then outputs a determination result of the collation as an inspection result.

In step S805, the inspection apparatus 0108 transmits the result of the printing-time defect inspection in step S801, the inspection result acquired in step S804, and the result of the quiet zone inspection acquired in step S905 (described below) to the inspection unit 0106. The inspection unit 0106 controls the large-capacity stacker 0107 so that a sheet for which a defect has been detected and a normally printed sheet are discharged to different trays. The inspection unit 0106 may transmit the inspection result to the UI panel 0203. In response to receiving the inspection result, the UI panel 0203 displays the inspection target scan image and the inspection result to the user. If a print product is defective, the UI panel 0203 emphasizes the detected defect with a dotted-line frame, a color frame, and/or the like, on the scan image and displays the type of the detected defect (dots or streaks) and positional information together with the defect. By contrast, if the print product is not defective, the UI panel 0203 displays a character string indicating non-defective.

The method for displaying the inspection result by the UI panel 0203 is not limited thereto but may be any method by which the detection result is clearly presented to the user.

Processing procedures to be performed by the inspection apparatus 0108 in the character recognition and the barcode recognition processing described above in conjunction with step S803 will be described in detail below with reference to FIG. 9.

In step S901, the inspection apparatus 0108 determines whether the inspection area rotated according to the setting in step S802 is a character string area or a barcode area. According to the present exemplary embodiment, the inspection apparatus 0108 performs this determination by reading the inspection settings stored in the storage unit 0228 in step S712 and then determining whether the determination target inspection area is a character string inspection area or a barcode inspection area. However, the determination may be based on other methods. If a result of determination in step S901 indicates that the inspection area is a character string area (YES in step S901), the processing proceeds to step S902. If the result of determination in step S901 indicates that the inspection area is a barcode area (NO in step S901), the processing proceeds to step S904.

In step S902, the inspection apparatus 0108 subjects the inspection area to dropout color processing to generate an image in which pixels of predetermined chromatic colors included in the inspection area have been removed. Then, the processing proceeds to step S903. A known technique is applicable to the dropout color processing, and detailed descriptions thereof will be omitted. The dropout color processing enables a predetermined color (for example, red) to be removed and also all chromatic colors to be removed while leaving only achromatic colors. The colors to be removed may be predetermined according to the contents of a document.

In step S903, the inspection apparatus 0108 subjects the image generated in step S902 to the character recognition processing. A known technique is applicable to the character recognition processing, and detailed descriptions thereof will be omitted.

In step S904, the inspection apparatus 0108 subjects the image in the inspection area rotated in step S802 to the recognition processing (decode processing) for a code image such as a barcode. A known technique is applicable to the barcode recognition processing (decode processing), and detailed descriptions thereof will be omitted.

In step S905, the inspection apparatus 0108 locates the position of the code image such as a barcode in the image of the inspection area rotated in step S802 and inspects whether a margin area (a quiet zone) is sufficiently allocated around the code image. If the margin area is not sufficiently allocated, the inspection apparatus 0108 outputs an inspection result indicating that the margin area is not sufficiently allocated (i.e., an inspection result indicating that the margin area is nonconforming). If the margin area is sufficiently allocated, the inspection apparatus 0108 outputs the inspection result indicating that the margin area is sufficiently allocated (i.e., an inspection result indicating that the margin area is OK). The barcode recognition processing (decode processing) in step S904 and the margin area (quiet zone) inspection processing in step S905 may be performed in reverse order.

In this way, the inspection apparatus 0108 performs the dropout color processing on the character string inspection area but does not perform the dropout color processing on the inspection area of code images (barcode and two-dimensional code).

With reference to drawings illustrating specific examples, a description will be provided of an improvement in the inspection accuracy for the character string and the code areas, which is produced by embodiment of the present disclosure in the above-described processing procedures.

Figure 10B:
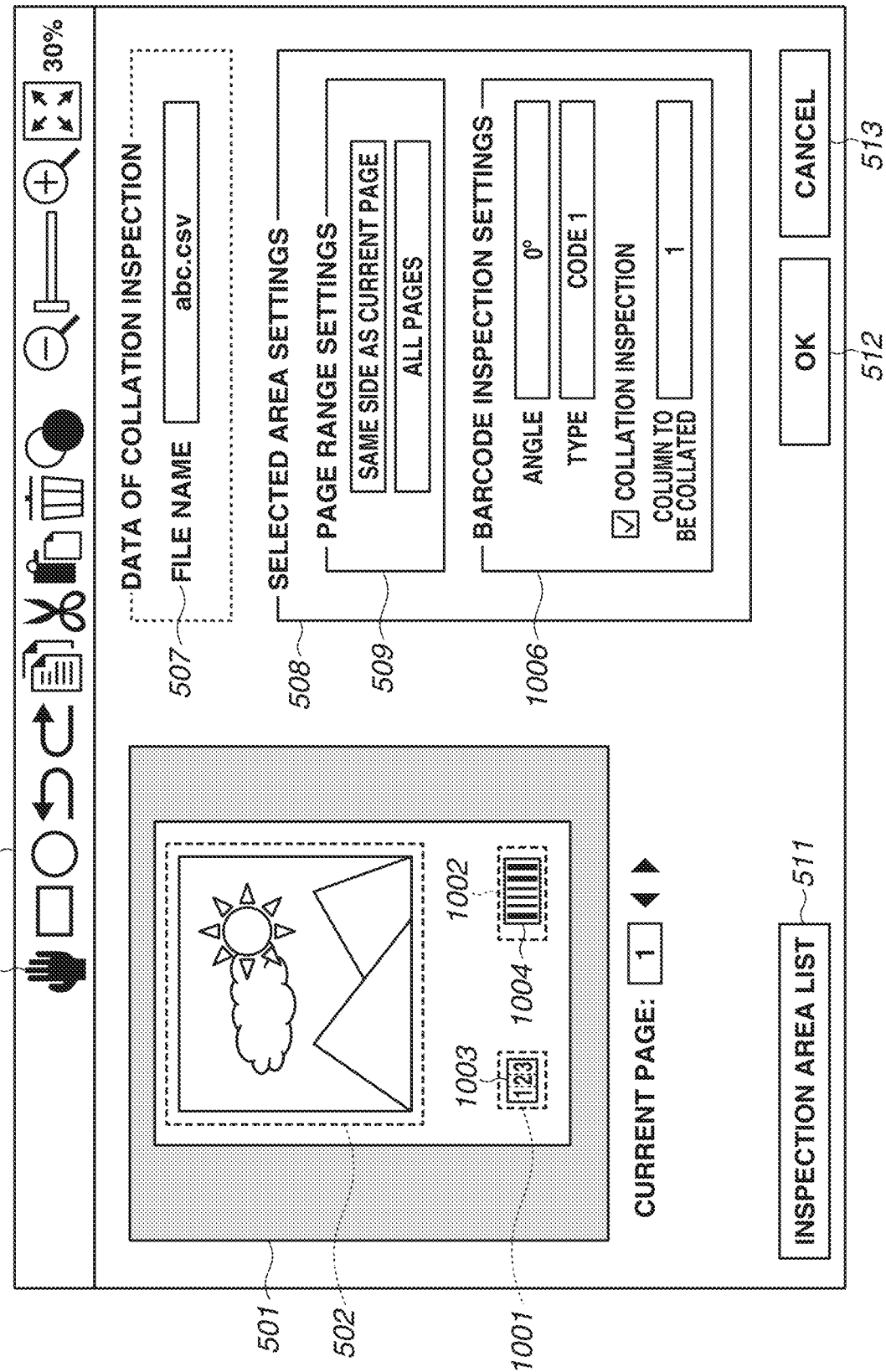

FIGS. 10A and 10B illustrate example cases where chromatic color frame lines are included in the inspection area in the inspection setting screens illustrated in FIGS. 5A and 5B. A character string inspection area 1001 includes a ruled line 1003 drawn with a chromatic color. A barcode inspection area 1002 includes a ruled line 1004 drawn with a chromatic color. Inspection settings in a frame 1005 are set in the character string inspection area 1001. Inspection settings in a frame 1006 are set in the barcode inspection area 1002. Further, the ruled line 1004 is arranged at a position close to the inspection target barcode. A margin area having a predetermined size required to correctly recognize the barcode, what is generally called a quiet zone, is not allocated. Therefore, from the viewpoint of the print quality inspection, the inspection result of the barcode inspection area 1002 is to be determined to be an inspection failure, in other words, it is to be determined that the barcode inspection area 1002 does not pass the inspection.

Figure 8:
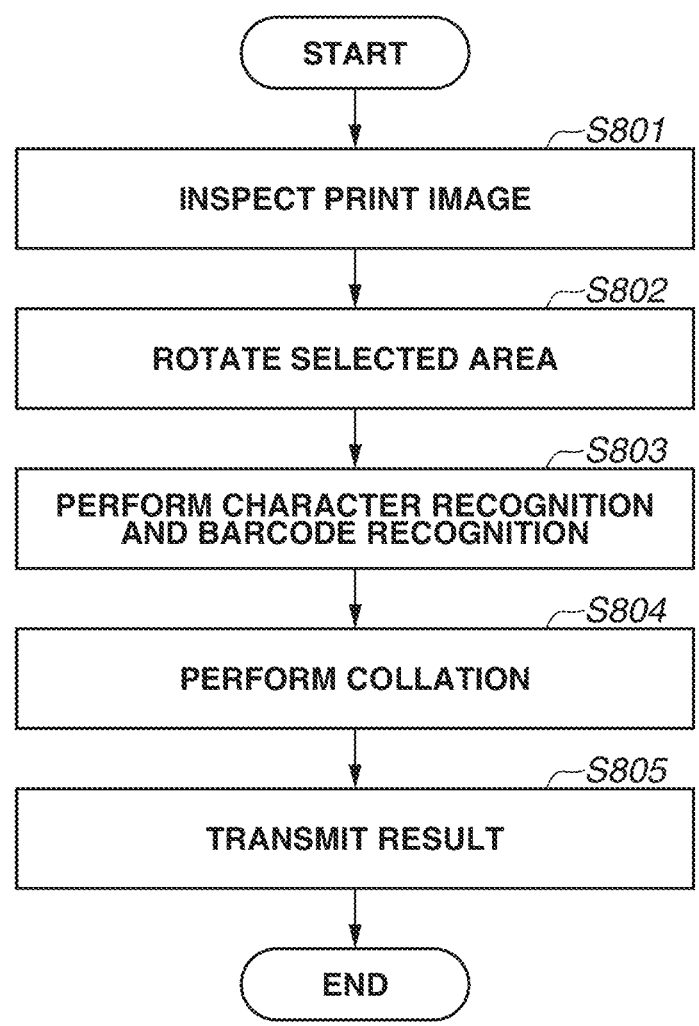
FIG. 8 is a flowchart for inspection execution processing.

An example operation of the inspection apparatus 0108 in a case where the character string inspection area 1001 and the barcode inspection area 1002 illustrated in FIGS. 10A and 10B are subjected to the inspection processing illustrated in FIGS. 8 and 9 will be described below.

Figure 9:
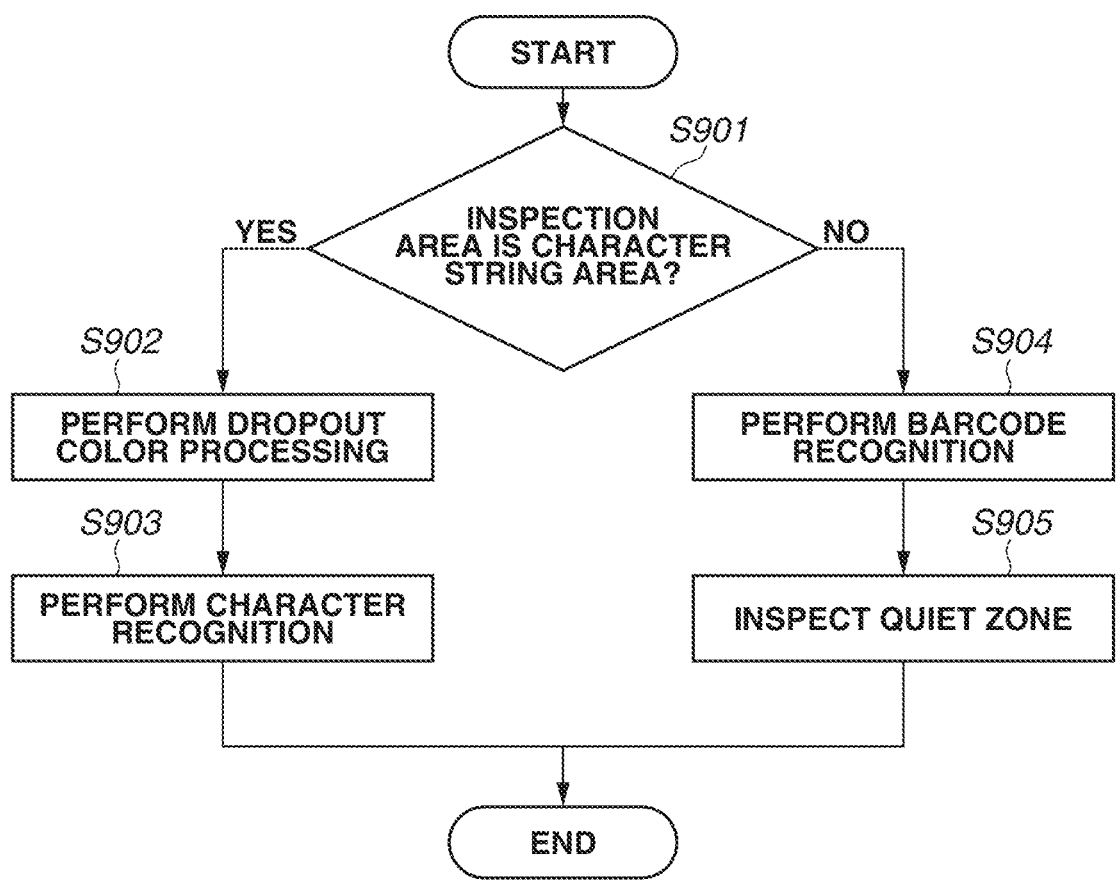
FIG. 9 is a flowchart for character and barcode recognition processing.

In step S803 after steps S801 and S802, the information processing apparatus 0109 subjects the character string inspection area 1001 and the barcode inspection area 1002 to the recognition processing illustrated in FIG. 9.

More specifically, the information processing apparatus 0109 determines that the character string inspection area 1001 is a "character string" in step S901, and subjects the character string inspection area 1001 to the dropout color processing in step S902 and then performs the character recognition processing in step S903.

By contrast, the information processing apparatus 0109 determines that the barcode inspection area 1002 is a "barcode (two-dimensional code)" in step S901, and subjects the barcode inspection area 1002 to the barcode recognition processing in step S904.

Figure 11A:
FIGS. 11A and 11B illustrate examples of input images to be subjected to the character and barcode recognition processing according to an exemplary embodiment.
Figure 11B:
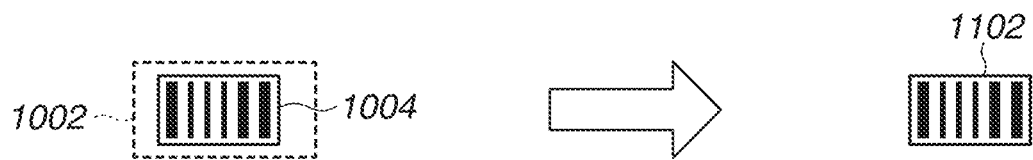

FIG. 11A illustrates a character string image 1101 to be subjected to that character recognition processing in step S903 in the above-described specific example. FIG. 11B illustrates a barcode inspection area 1102 to be subjected to the barcode recognition processing in step S904 in the above-described specific example. The ruled line 1003 is removed from the character string area 1101 while the ruled line 1004 is not removed from the barcode inspection area 1102. As a result, the character recognition processing for the character string area 1101 in step S903 enables recognition of the area as one being indicated by the correct answer character string described in the reference CSV file. Thus, the character string area 1101 passes the subsequent collation inspection in step S804. By contrast, the barcode recognition processing for the barcode inspection area 1102 in step S904 cannot detect a barcode due to an insufficient quiet zone or cannot recognize the area as one being indicated by the correct answer character string. Thus, the barcode inspection area 1102 cannot pass the collation inspection in step S804.

As described above using the specific examples, performing the print product inspection with the procedures according to the present exemplary embodiment improves the character recognition accuracy for a character string inspection area that is important for the inspection from the viewpoint as to whether a character string is correctly printed. For a barcode inspection area with which not only the viewpoint as to whether a character string is correctly printed but also the viewpoint as to whether a printed barcode is arranged to be correctly recognized are important for inspection, the present exemplary embodiment enables implementation of an inspection based on these viewpoints. As a result, it becomes possible to improve the inspection accuracy for a character string area and a barcode area.

A second exemplary embodiment of the present disclosure will be described below. The present exemplary embodiment enables specification as to whether to subject each inspection area to the dropout color processing, which has been described in the first exemplary embodiment, by suitably using the present disclosure, thus enabling flexible inspections, which will be described below with reference to the accompanying drawings. In the present exemplary embodiment, descriptions will be provided only portions different from those of the first exemplary embodiment. For configurations and processing procedures similar to those of the first exemplary embodiment, redundant descriptions will be omitted.

Figure 12B:
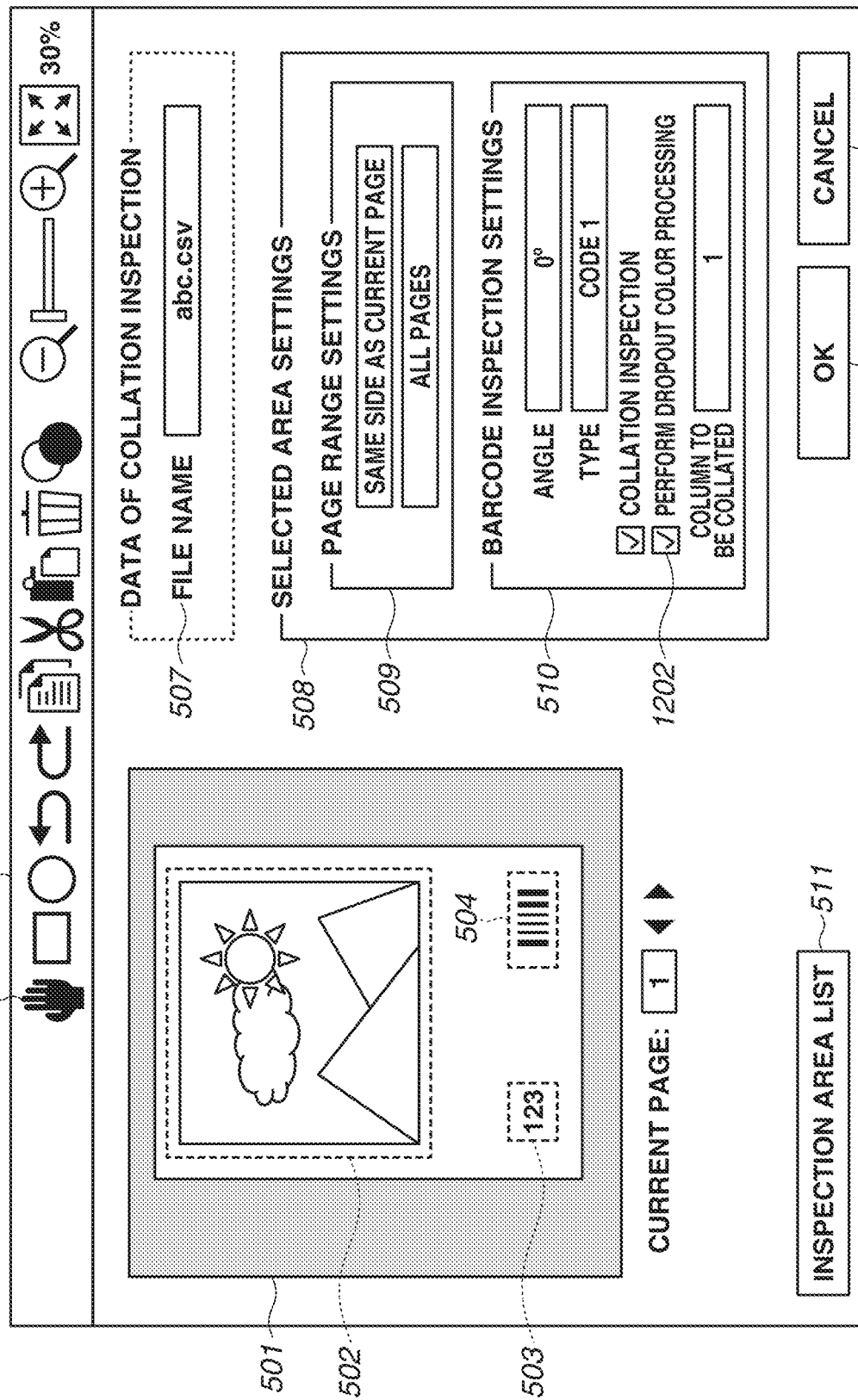

FIGS. 12A and 12B illustrate examples of inspection setting screens according to the present exemplary embodiment displayed on the UI panel 0102 to receive inspection setting operations from the user. Check boxes 1201 and 1202 are used to set whether to perform the dropout color processing when inspecting the character string inspection area 503 and the barcode inspection area 504, respectively. The settings of these check boxes are reflected by the inspection apparatus 0108 in steps S706 and S709 and stored as inspection settings in step S712.

FIG. 13 is a flowchart illustrating detailed processing procedures of the character recognition and the barcode recognition processing in step S803 according to the present exemplary embodiment.

In step S1301, the inspection apparatus 0108 reads the inspection settings stored in step S712 and determines whether to subject the inspection areas to the dropout color processing. The inspection apparatus 0108 makes the determination in step S712 by determining whether the check box 1201 or 1202 for the inspection setting corresponding to the inspection area is checked. If the check box is checked, the inspection apparatus 0108 determines that the dropout color processing is to be performed (YES in step S1301), and the processing proceeds to S902. In step S902, the inspection apparatus 0108 performs the dropout color processing. Then, the processing proceeds to step S901. By contrast, if the check box is not checked, the inspection apparatus 0108 determines that the dropout color processing is not to be performed (NO in step S1301), and the processing proceeds to step S901.

In step S901, the inspection apparatus 0108 determines whether the inspection area is a character string area or a barcode area with the same procedures as those according to the first exemplary embodiment. If a result of the determination indicates that the inspection area is a character string area (YES in step S901), the processing proceeds to step S903. If the result of the determination indicates that the inspection area is a barcode area (NO in step S901), the processing proceeds to step S904.

Performing the above-described procedures enables the user to specify whether to perform the dropout color processing for each inspection area, improving the flexibility of inspections.

A third exemplary embodiment of the present disclosure will be described below. The third exemplary embodiment enables direct determination as to whether the quiet zone is sufficiently allocated in a barcode inspection area.

In the third exemplary embodiment, descriptions will be provided of only portions different from those of the first and the second exemplary embodiments. For configurations and processing procedures similar to those of the first and the second exemplary embodiments, redundant descriptions will be omitted.

Figure 14:
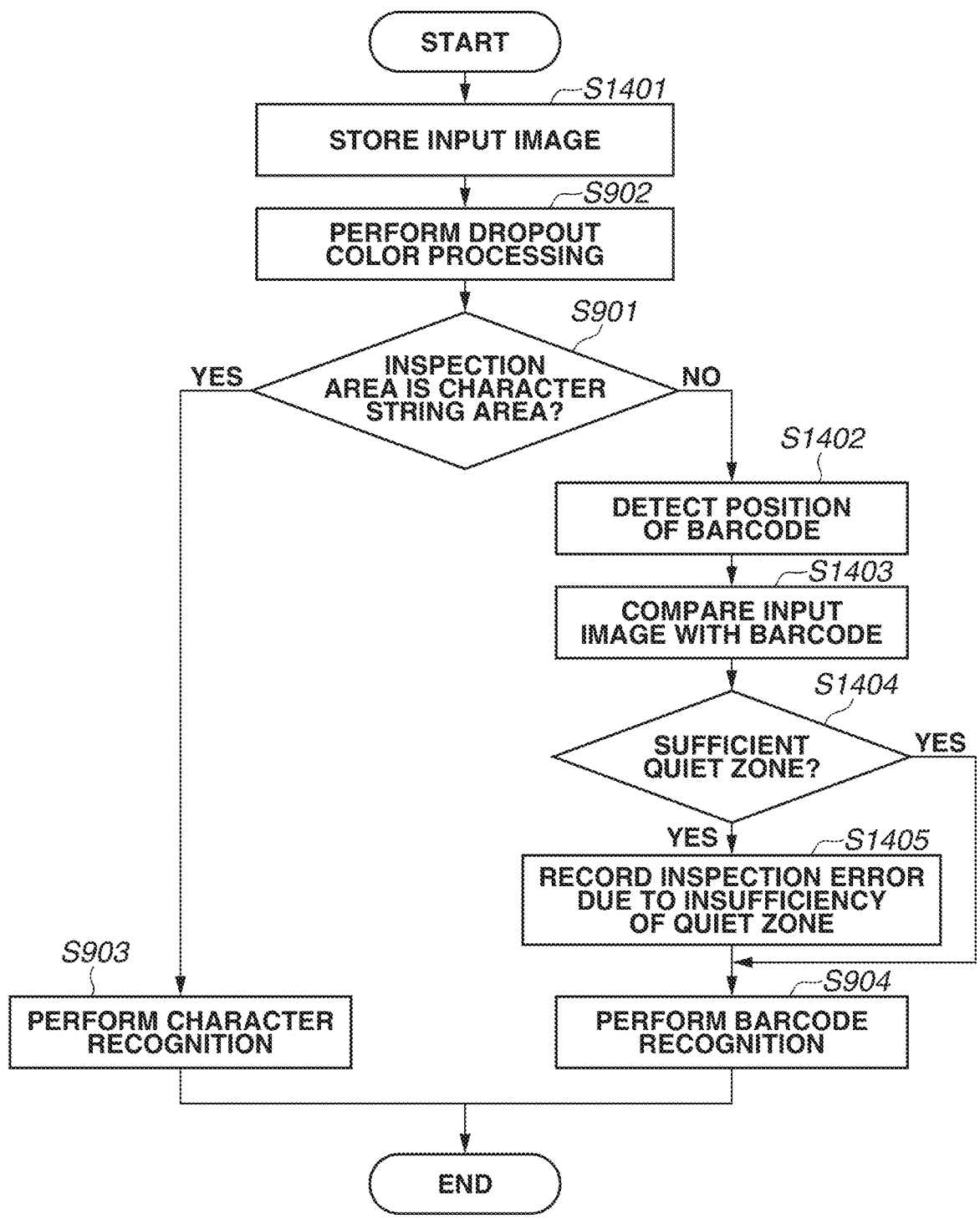
FIG. 14 is still another flowchart for character and barcode recognition processing.

FIG. 14 is a flowchart illustrating detailed processing procedures of the character recognition processing and the barcode recognition processing in step S803 according to the present exemplary embodiment.

In step S1401, the inspection apparatus 0108 stores the input image of the inspection area in the storage unit 0228.

In step S902, the inspection apparatus 0108 subjects the input image of the inspection area to the dropout color processing. Then, the processing proceeds to step S901. If the inspection area is determined to be a barcode area (NO in step S901), the processing proceeds to step S1402 according to the present exemplary embodiment.

In step S1402, the inspection apparatus 0108 detects the position of a code image (barcode or two-dimensional code) in the image, having been subjected to the dropout color processing, generated in S902. A known technique is applicable to the method of detecting the barcode position. A method may be applicable by which a binarization image of the image after the dropout color processing is generated and the coordinates of the outermost circumscribed rectangle of the black pixels group included in the binarization image is acquired.

In step S1403, the inspection apparatus 0108 initially reads the input image stored in step S1401, from the storage unit 0228, and compares the position of the read image before the dropout color processing with the barcode position detected in step S1402. More specifically, the inspection apparatus 0108 determines whether the margin area (quiet zones) is sufficiently present around the barcode position in the input image that has not been subjected to the dropout color processing.

In step S1404, the inspection apparatus 0108 determines whether the quiet zone is sufficiently present in the input image based on a comparison result in step S1403. The method of determining whether the quiet zone is sufficiently present may be any method and is not limited to a specific one. Examples of such a method include a method of searching the input image for a minimum required quiet zone in the vicinity of the rectangle indicating the barcode position acquired in step S1402, and determining whether a cluster of pixels or a ruled line different from pixels of the barcode is present. Alternatively, the inspection apparatus 0108 may perform a barcode grade inspection for the input image by using a barcode recognition engine having a function of determining the grade of a barcode (function of determining the print quality of a barcode) and use an evaluation result of the quiet zone acquired from a grade inspection result. Generally, the size of the quiet zone of a barcode depends on the type and size of the target barcode, so that attention is to be paid to that the size of the above-described minimum required quiet zone depends on the barcode inspection area. If the inspection apparatus 0108 determines that the quiet zone is sufficiently present (YES in step S1404), the processing proceeds to step S904. If the inspection apparatus 0108 determines that the quiet zone is not sufficiently present (NO in step S1404), the processing proceeds to step S1405.

In step S1405, the inspection apparatus 0108 records that the target barcode inspection area cannot pass the inspection due to insufficiency of the quiet zone, in the storage unit 0228 as an inspection result.

FIG. 15 illustrates an example screen displaying the result of the inspection performed in step S803.

A Stop Inspection button 1501 for starting or stopping the inspection changes the status of the CPU 0226. The user pressing this button when the CPU 0226 is in the non-inspection state causes the CPU 0226 to enter the inspection standby state and the inspection is started. The user pressing this button when the CPU 0226 is in the inspection standby state causes the CPU 0226 to enter the non-inspection state and the inspection is stopped.

An inspection area display 1502 enables the user to preview the inspection area for the currently selected inspection setting.

An inspection result table 1503 indicates a list of results of inspections performed. This table displays information for uniquely identifying the inspection area, including "Inspection No." indicating the inspection area in a page, "Page No." indicating the page number, "Copy No." indicating the copy number, and "Side No." indicating the front or back side. The table further displays the inspection result for the inspection area and a failed inspection result, i.e., details of failure when the inspection area cannot pass the inspection. In this example, the table displays inspection results for the inspection areas 1001 and 1002 illustrated in FIGS. 10A and 10B according to the first exemplary embodiment as inspection Nos. 1 and 2, respectively. The quiet zone in the barcode inspection area 1002 is determined to be insufficient in step S1404 in the processing procedures illustrated in FIG. 14, and the inspection result is clearly displayed as "Insufficient Quiet Zone" in Details of Failure for Inspection No. 2.

When the user presses an inspection processing completion button 1504, the inspection apparatus 0108 completes the inspection processing, stores the inspection result in the storage unit 0228, and ends the inspection processing. When the CPU 0226 is currently performing the inspection, the inspection processing completion button 0604 may be disabled to be prevented from being pressed.

Performing the above-described procedures enables clearly notifying the user of insufficiency of a quiet zone as an inspection result for a certain area, making it possible to improve the user's convenience in performing inspections.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-140731, filed Aug. 31, 2021, which is hereby incorporated by reference herein in its entirety.

What is claimed is:

1. An inspection apparatus comprising:
at least one memory that stores instructions; and
at least one processor that executes the instructions to:
perform dropout color processing on a first inspection area set for an image generated by reading a print product and then perform first recognition processing for recognizing a character on the first inspection area; and
perform second recognition processing for decoding a code included in a second inspection area set for the image on the second inspection area and then perform an inspection as to whether a margin area is sufficiently allocated around the code, without performing the dropout color processing,
wherein the code included in the second inspection area is a barcode or a two-dimensional code.

2. The inspection apparatus according to claim 1, wherein the first inspection area includes a character string, and the second inspection area includes the barcode or the two-dimensional code.

3. The inspection apparatus according to claim 1, wherein the at least one processor executes the instructions to inspect print quality of the print product, based on a result of comparison between a result of character recognition processing and a first correct answer character string corresponding to a character string included in the first inspection area, a result of comparison between a result of decode processing and a second correct answer character string corresponding to the code included in the second inspection area, and a result of the inspection as to whether the margin area is sufficiently allocated.

4. The inspection apparatus according to claim 1,
wherein the at least one processor executes the instructions to specify an inspection area to be subjected to the dropout color processing based on a user operation, and
wherein, in a case where the first inspection area is specified as an inspection area to be subjected to the dropout color processing, the at least one processor performs the dropout color processing on the first inspection area and then performs the first recognition processing on the first inspection area.

5. The inspection apparatus according to claim 1, wherein the at least one processor executes the instructions to further perform an inspection as to whether an image defect is present on a third inspection area set for the image.

6. The inspection apparatus according to claim 4, wherein, in a case where the first inspection area is specified as an inspection area not to be subjected to the dropout color processing, the at least one processor performs character recognition processing on the first inspection area without performing the dropout color processing.

7. An inspection apparatus comprising:
at least one memory that stores instructions; and
at least one processor that executes the instructions to:
perform dropout color processing on an input image of an inspection area to generate an image having been subjected to the dropout color processing;
detect a position of a code image in a case where the code image is included in an inspection area set for the image having been subjected to the dropout color processing;
determine whether a margin area is sufficiently present around the detected position of the code image in the input image; and
record an insufficiency of the margin area in a case where it is determined that the margin area is not sufficiently present.

8. An inspection method comprising:
performing dropout color processing on a first inspection area set for an image generated by reading a print product and then performing first recognition processing for recognizing a character on the first inspection area; and
performing second recognition processing for decoding a code included in a second inspection area set for the image on the second inspection area and then performing an inspection as to whether a margin area is sufficiently allocated around the code, without performing dropout color processing,
wherein the code included in the second inspection area is a barcode or a two-dimensional code.

9. An inspection method comprising:
performing dropout color processing on an input image of an inspection area to generate an image having been subjected to the dropout color processing;
detecting a position of a code image in a case where the code image is included in an inspection area set for the image having been subjected to the dropout color processing;
determining whether a margin area is sufficiently present around the detected position of the code image in the input image; and
recording an insufficiency of the margin area in a case where it is determined that the margin area is not sufficiently present.

10. A non-transitory computer-readable storage medium that stores a program, wherein the program causes a processor to:
perform dropout color processing on a first inspection area set for an image generated by reading a print product and then perform first recognition processing for recognizing a character on the first inspection area; and
perform second recognition processing for decoding a code included in a second inspection area set for the image on the second inspection area and then perform an inspection as to whether a margin area is sufficiently allocated around the code, without performing dropout color processing,
wherein the code included in the second inspection area is a barcode or a two-dimensional code.

11. A non-transitory computer-readable storage medium that stores a program, wherein the program causes a processor to:
perform dropout color processing on an input image of an inspection area to generate an image having been subjected to the dropout color processing;
detect a position of a code image in a case where the code image is included in an inspection area set for the image having been subjected to the dropout color processing;
determine whether a margin area is sufficiently present around the detected position of the code image in the input image; and
record an insufficiency of the margin area in a case where it is determined that the margin area is not sufficiently present.

* * * * *